United States Patent [19]

Ohishi et al.

[11] Patent Number: 5,623,705
[45] Date of Patent: Apr. 22, 1997

[54] APPARATUS FOR INSPECTING BLUR CORRECTION CAMERA, BLUR CORRECTION CAMERA, AND METHOD OF INSPECTING BLUR CORRECTION CAMERA

[75] Inventors: Sueyuki Ohishi, Tokyo; Tadao Kai, Kawasaki, both of Japan

[73] Assignee: Nikon Corporation, Tokyo, Japan

[21] Appl. No.: 597,112

[22] Filed: Feb. 6, 1996

Related U.S. Application Data

[62] Division of Ser. No. 377,512, Jan. 24, 1995, and a continuation of Ser. No. 377,517, Jan. 24, 1995, abandoned.

[30] Foreign Application Priority Data

Mar. 18, 1994 [JP] Japan .................... 6-048126
Mar. 18, 1994 [JP] Japan .................... 6-048482
Mar. 18, 1994 [JP] Japan .................... 6-048627

[51] Int. Cl.$^6$ .................................. G03B 17/00
[52] U.S. Cl. ............................................ 396/55
[58] Field of Search .................... 354/430, 202, 354/70, 410, 289.12; 348/208; 396/52, 53, 54, 55

[56] References Cited

U.S. PATENT DOCUMENTS

| | | |
|---|---|---|
| 4,734,724 | 3/1988 | Braunschweig et al. . |
| 5,130,729 | 7/1992 | Sato et al. . |
| 5,134,434 | 7/1992 | Inoue et al. . |
| 5,155,520 | 10/1992 | Nagasaki et al. . |
| 5,166,723 | 11/1992 | Yoshida et al. ............ 354/430 |
| 5,192,964 | 3/1993 | Shinohara et al. . |
| 5,237,365 | 8/1993 | Miyazawa . |
| 5,270,767 | 12/1993 | Hamada et al. . |
| 5,365,303 | 11/1994 | Yamasaki et al. . |
| 5,376,993 | 12/1994 | Kubota et al. . |
| 5,386,264 | 1/1995 | Sekine et al. ............ 354/430 |
| 5,416,554 | 5/1995 | Hamada et al. . |
| 5,444,509 | 8/1995 | Ohishi . |
| 5,459,542 | 10/1995 | Fujiwara et al. . |

FOREIGN PATENT DOCUMENTS

| | | |
|---|---|---|
| 1-291165 | 7/1988 | Japan . |
| 4-181932 | 10/1990 | Japan . |
| 2-228518 | 12/1990 | Japan . |

OTHER PUBLICATIONS

08/377,436 Jan. 24, 1995 Sueyuki Ohishi, et al. Nikon Corporation.
08/377,786 Jan. 24, 1995 Sueyuki Ohishi, et al. Nikon Corporation.
08/377,512 Jan. 24, 1995 Sueyuki Ohishi, et al. Nikon Corporation.

*Primary Examiner*—Safet Metjahic
*Assistant Examiner*—John Chizmar

[57] ABSTRACT

An apparatus for inspecting a blur correction function of a blur correction camera, which comprises an optical axis changing unit for changing the optical axis of a photographing optical system so as to correct a blur generated by a vibration, a displacement detecting unit for detecting a displacement of the photographing optical system by the optical axis changing unit, a maximum/minimum displacement detecting unit for detecting maximum and minimum values of an output value from the displacement detecting unit, and an angular velocity detecting unit for detecting an angular velocity caused by the vibration, includes: an information exchange unit for exchanging information with the blur correction camera, a vibration applying unit for applying a sinusoidal vibration having a predetermined angular amplitude in a detection direction of the angular velocity of the angular velocity detecting unit of the blur correction camera, a reading unit for reading an output value from the maximum/minimum displacement detecting unit of the blur correction camera upon application of the sinusoidal vibration, and a discrimination unit for discriminating, based on the output value read by the reading unit, whether or not the blur correction function of the blur correction camera is normal.

16 Claims, 17 Drawing Sheets

| FIG. 7A |
| FIG. 7B |
| FIG. 7C |

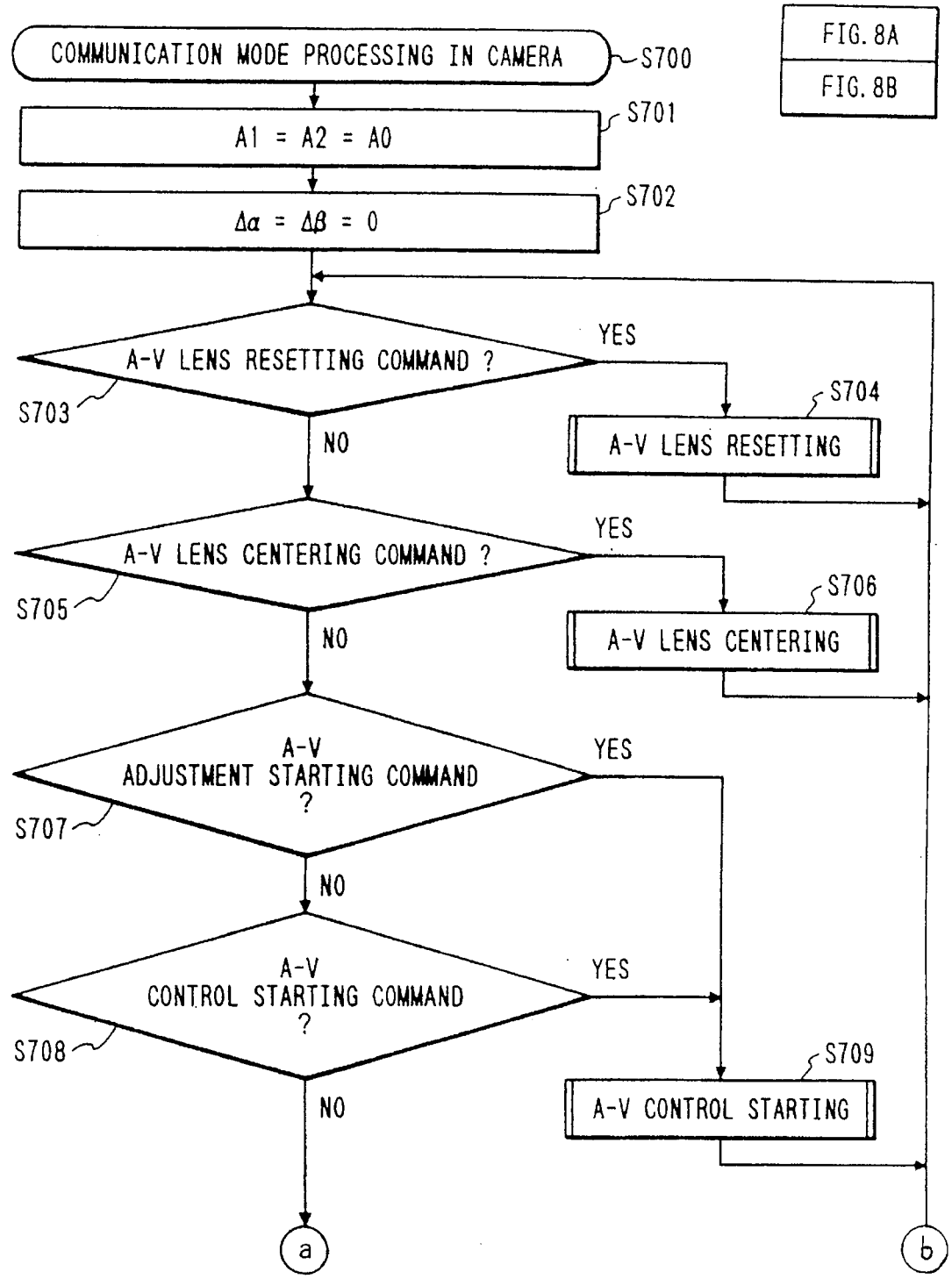

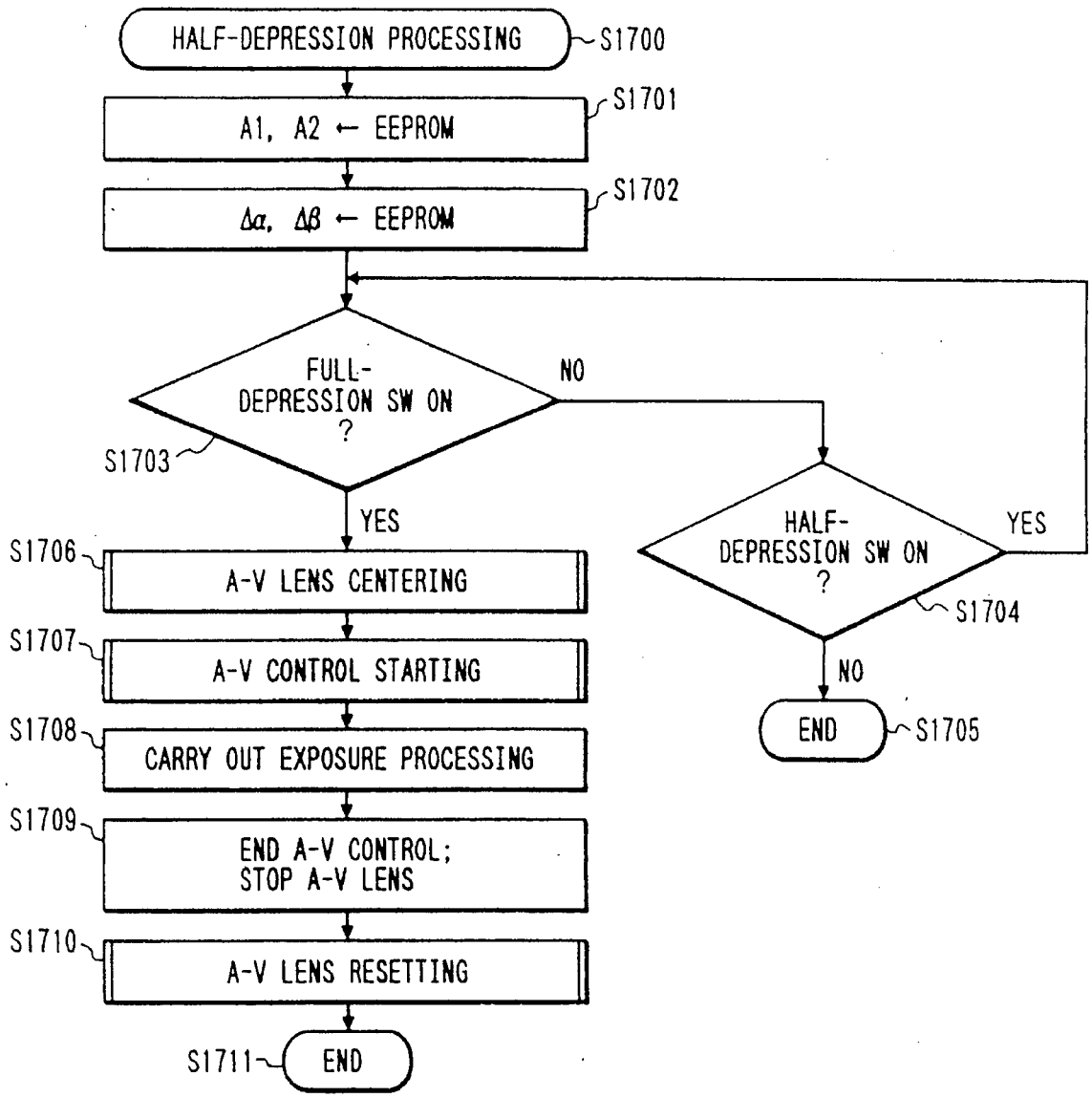

APPARATUS FOR INSPECTING BLUR CORRECTION CAMERA, BLUR CORRECTION CAMERA, AND METHOD OF INSPECTING BLUR CORRECTION CAMERA

This application is a division of application Ser. No. 08/377,512, filed Jan. 24, 1995, now pending, and a continuation of U.S. application Ser. No. 08/377,517, filed Jan. 24, 1995, now abandoned.

BACKGROUND OF THE INVENTION

1. Field of the Invention

The present invention relates to an apparatus for inspecting a blur correction camera which can correct an image blur caused by, e.g., a camera shake generated in a photographing operation, the blur correction camera, and a method of inspecting the blur correction camera.

2. Related Background Art

As conventional blur correction cameras of this type, the following blur correction camera is known. An angular velocity detecting circuit using, e.g., an angular velocity sensor, detects at least the angular velocities caused by vibrations in two directions on a plane perpendicular to the optical axis of the camera. A blur correction lens (anti-vibration lens), as a part of a photographing lens, is shifted in substantially the same directions as the detecting directions, thereby moving the optical axis of a photographing optical system. The photographic optical system is driven by decelerating the rotation of an actuator such as a motor using gears and the like and converting the rotation into a linear motion. With these operations, an image blur caused by a vibration generated in the camera can be corrected (this control will also be referred to as anti-vibration control hereinafter).

Such a camera is manufactured while being divided into some portions (partial assemblies) in its manufacturing process, and the partial assemblies are fully assembled after their operations are checked. For example, a correction lens shift mechanism system for shifting the blur correction lens by rotating a motor is assembled in a camera main body after checking whether it normally operates as a single partial assembly. The same applies to the angular velocity detecting circuit for detecting angular velocities caused by a camera shake.

However, the above-mentioned conventional blur correction camera suffers the following problems.

First, the correction lens shift mechanism system and the angular velocity detecting circuit often perform abnormal operations when they are assembled in the camera main body or cannot often provide satisfactory operation performance although they are good in the operation check process as partial assemblies. In the fully assembled state of the camera, the checking operations cannot be performed.

Second, the output from an angular velocity sensor used in the angular velocity detecting circuit suffers an individual difference (a variation among devices), and the output value of each angular velocity sensor upon reception of a predetermined angular velocity is not constant. Also, an amplifier in the angular velocity detecting circuit suffers a gain variation. Furthermore, the output value from the angular velocity detecting circuit is often converted into a digital value by, e.g., an internal A/D converter of a microcomputer. The A/D converter also suffers an individual difference, and a digital value obtained by A/D-converting a predetermined input voltage is not constant. Note that it is not so difficult to adjust the gain variation of the angular velocity detecting circuit in the state of the partial assembly. However, in this case, an error caused by a variation of the A/D converter still remains. When blur correction is performed in a state with the gain variation, blur correction cannot be performed with high precision.

Third, the angular velocity sensor used in the angular velocity detecting circuit is supported in a space by a vibration member wire-shaped support member for determining the direction of an axis in which the angular velocity of the rotation is to be detected, as disclosed in Japanese Laid-Open Patent Application No. 2-228518. The angular velocity sensor, to which legs of the support member are fixed, has a structure that can easily cause an individual difference of the detection axis. Furthermore, errors of the mounting direction occur in a process of mounting the angular velocity sensor in the angular velocity detecting circuit and in a process of assembling the angular velocity detecting circuit in the camera main body. With these errors, a deviation is generated between the detecting direction of the angular velocity of the angular velocity detecting circuit and the moving direction of the optical axis which is attained by actually shifting the blur correction lens (this deviation will also be referred to as a detection angular deviation since the deviation in the detecting direction of the angular velocity detecting circuit is dominant). The angular deviation is often as large as 5° or more. As described above, when the detecting direction of the angular velocity and the moving direction of the optical axis have an angular deviation therebetween, blur correction cannot be performed with high precision.

SUMMARY OF THE INVENTION

The present invention has been made to solve the above-mentioned problems, and has as an object to allow precise blur correction by checking operations of partial assemblies such as a blur correction lens shift mechanism system, an angular velocity detecting circuit, and the like in a fully assembled state of a camera, and adjusting gain variations of output values among devices of the partial assemblies.

In order to achieve the above object, according to a first aspect of the present invention, there is provided an apparatus for inspecting a blur correction function of a blur correction camera, which comprises an optical axis changing unit for changing an optical axis of a photographing optical system so as to correct a blur generated by a vibration, a displacement detecting unit for detecting a displacement of the photographing optical system by the optical axis changing unit, a maximum/minimum displacement detecting unit for detecting maximum and minimum values of an output value from the displacement detecting unit, and an angular velocity detecting unit for detecting an angular velocity caused by the vibration. The apparatus comprises: an information exchange unit for exchanging information with the blur correction camera; a vibration applying unit for applying a sinusoidal vibration having a predetermined angular amplitude in a detection direction of the angular velocity of the angular velocity detecting unit of the blur correction camera; a reading unit for reading an output value from the maximum/minimum displacement detecting unit of the blur correction camera upon application of the sinusoidal vibration; and a discrimination unit for discriminating, based on the output value read by the reading unit, whether or not the blur correction function of the blur correction camera is normal.

According to a second aspect of the present invention, there is provided an apparatus for inspecting a blur correction function of a blur correction camera, which comprises an optical axis changing unit for changing an optical axis of a photographing optical system so as to correct a blur generated by a vibration, a displacement detecting unit for detecting a displacement of the photographing optical system by the optical axis changing unit, an angular velocity detecting unit for detecting an angular velocity caused by the vibration, a first calculation unit for calculating a target displacement position of the optical axis changing unit by integrating or accumulating an output value from the angular velocity detecting unit, and a second calculation unit for calculating a control error of the optical axis changing unit on the basis of an output value from the displacement detecting unit and an output value from the first calculation unit during operation of the optical axis changing unit. The apparatus comprises: an information exchange unit for exchanging information with the blur correction camera; a vibration applying unit for applying a predetermined vibration to the blur correction camera; a reading unit for reading an output value from the second calculation unit of the blur correction camera upon application of the predetermined vibration; and a discrimination unit for discriminating, based on the output value read by the reading unit, whether or not the blur correction function of the blur correction camera is normal.

The reading unit preferably reads maximum and minimum values of the control error calculated by the second calculation unit of the blur correction camera, and the discrimination unit preferably discriminates, based on the maximum and minimum values, whether or not the blur correction function of the blur correction camera is normal.

According to the third aspect of the present invention, there is provided a blur correction camera. The blur correction camera comprises: an optical axis changing unit for changing an optical axis of a photographing optical system so as to correct a blur generated by a vibration; a displacement detecting unit for detecting a displacement of the photographing optical system by the optical axis changing unit; a maximum/minimum displacement detecting unit for detecting maximum and minimum values of an output value from the displacement detecting unit; and an angular velocity detecting unit for detecting an angular velocity caused by the vibration, and the camera is characterized in that whether or not a blur correction function is normal is discriminated on the basis of an output value from the maximum/minimum displacement detecting unit during operation of the optical axis changing unit upon application of a sinusoidal vibration having a predetermined angular amplitude in a detection direction of the angular velocity of the angular velocity detecting unit.

According to a fourth aspect of the present invention, there is provided a blur correction camera. The blur correction camera comprises: an optical axis changing unit for changing an optical axis of a photographing optical system so as to correct a blur generated by a vibration; a displacement detecting unit for detecting a displacement of the photographing optical system by the optical axis changing unit; an angular velocity detecting unit for detecting an angular velocity caused by the vibration; a first calculation unit for calculating a target displacement position of the optical axis changing unit by integrating or accumulating an output value from the angular velocity detecting unit; and a second calculation unit for calculating a control error of the optical axis changing unit on the basis of an output value from the displacement detecting unit and an output value from the first calculation unit during operation of the optical axis changing unit, and the camera operates such that whether or not a blur correction function is normal is discriminated on the basis of an output value from the second calculation unit during operation of the optical axis changing unit upon application of a predetermined vibration.

Whether or not the blur correction function is normal is preferably discriminated on the basis of a maximum value and/or a minimum value of the control error calculated by the second calculation unit.

According to a fifth aspect of the present invention, there is provided a method of inspecting a blur correction function of a blur correction camera, which comprises an optical axis changing unit for changing an optical axis of a photographing optical system so as to correct a blur generated by a vibration, and an angular velocity detecting unit for detecting an angular velocity caused by the vibration. The method comprises the steps of: applying a sinusoidal vibration having a predetermined angular amplitude in a detection direction of the angular velocity of the angular velocity detecting unit of the blur correction camera; detecting maximum and minimum values of a displacement of the photographing optical system by the optical axis changing unit upon application of the sinusoidal vibration; and discriminating, based on the maximum and minimum values, whether or not the blur correction function is normal.

According to a sixth aspect of the present invention, there is provided a method of inspecting a blur correction function of a blur correction camera, which comprises an optical axis changing unit for changing an optical axis of a photographing optical system so as to correct a blur generated by a vibration, and an angular velocity detecting unit for detecting an angular velocity caused by the vibration. The method comprises the steps of: applying a predetermined vibration to the blur correction camera; calculating a target displacement position of the optical axis changing unit by integrating or accumulating an output value from the angular velocity detecting unit upon application of the predetermined vibration; calculating a control error of the optical axis changing unit on the basis of a displacement of the photographing optical system by the optical axis changing unit and the target displacement position; and discriminating, based on the control error, whether or not the blur correction function is normal.

Whether or not the blur correction function is normal is preferably discriminated on the basis of a maximum value and/or a minimum value of the control error.

In the first to sixth aspects of the present invention, first, the maximum and minimum displacements of the photographing optical system are detected upon application of a sinusoidal vibration having a predetermined angular amplitude in the detecting direction of the angular velocity of the angular velocity detecting unit, and whether or not the blur correction function is normal is determined based on the detection result. Second, a control error is calculated on the basis of the displacement of the photographing optical system upon application of a predetermined vibration, and the target displacement position calculated from the output from the angular velocity detecting unit, and whether or not the blur correction function is normal is determined based on the calculated control error. Therefore, the blur correction function can be easily checked in the fully assembled state of the camera.

Furthermore, according to a seventh aspect of the present invention, there is provided an apparatus for inspecting a blur correction function of a blur correction camera, which comprises an optical axis changing unit for changing an optical axis of a photographing optical system so as to correct a blur generated by a vibration, a displacement detecting unit for detecting a displacement of the photographing optical system by the optical axis changing unit, a maximum/minimum displacement detecting unit for detecting maximum and minimum values of an output value from the displacement detecting unit, an angular velocity detecting unit for detecting an angular velocity caused by the vibration, and a gain correction unit for correcting a gain variation among devices in the angular velocity detecting unit on the basis of a gain adjustment value for adjusting a gain variation of output values among the devices of the angular velocity detecting unit. The apparatus comprises: an information exchange unit for exchanging information with the blur correction camera; a vibration applying unit for applying a predetermined vibration to the blur correction camera; a gain adjustment value changing unit for changing the gain adjustment value to a value corresponding to an angle or angular velocity range of the vibration to be applied; and a discrimination unit for discriminating whether or not the blur correction function is normal, on the basis of an output value from the maximum/minimum displacement detecting unit, which is obtained using the gain adjustment value which is changed by the gain adjustment value changing unit in correspondence with the angle or angular velocity range of the predetermined vibration when the vibration applying unit applies the predetermined vibration to the blur correction camera.

According to an eighth aspect of the present invention, there is provided an apparatus for inspecting a blur correction function of a blur correction camera, which comprises an optical axis changing unit for changing an optical axis of a photographing optical system so as to correct a blur generated by a vibration, a displacement detecting unit for detecting a displacement of the photographing optical system by the optical axis changing unit, an angular velocity detecting unit for detecting an angular velocity caused by the vibration, a gain correction unit for correcting a gain variation among devices in the angular velocity detecting unit on the basis of a gain adjustment value for adjusting a gain variation of output values among the devices of the angular velocity detecting unit, a first calculation unit for calculating a target displacement position of the optical axis changing unit by integrating or accumulating an output from the gain correction unit, and a second calculation unit for calculating a control error of the optical axis changing unit on the basis of an output from the displacement detecting unit and the target displacement position calculated by the first calculation unit during operation of the optical axis changing unit. The apparatus comprises: an information exchange unit for exchanging information with the blur correction camera; a vibration applying unit for applying a predetermined vibration to the blur correction camera; a gain adjustment value changing unit for changing the gain adjustment value to a value corresponding to an angle or angular velocity range of the vibration to be applied; and a discrimination unit for discriminating whether or not the blur correction function is normal, on the basis of the control error from the second calculation unit, which is obtained using the gain adjustment value which is changed by the gain adjustment value changing unit in correspondence with the angle or angular velocity range of the predetermined vibration when the vibration applying unit applies the predetermined vibration to the blur correction camera.

The discrimination unit preferably discriminates based on a maximum value and/or a minimum value of the control error whether or not the blur correction function of the blur correction camera is normal.

According to a ninth aspect of the present invention, there is provided a blur correction camera. The blur correction camera comprises: an optical axis changing unit for changing an optical axis of a photographing optical system so as to correct a blur generated by a vibration; a displacement detecting unit for detecting a displacement of the photographing optical system by the optical axis changing unit; a maximum/minimum displacement detecting unit for detecting maximum and minimum values of an output value from the displacement detecting unit; an angular velocity detecting unit for detecting an angular velocity caused by the vibration; and a gain correction unit for correcting a gain variation among devices in the angular velocity detecting unit on the basis of a gain adjustment value for adjusting a gain variation of output values among the devices of the angular velocity detecting unit, and the camera is characterized in that the gain adjustment value is changed to a value corresponding to an angle or angular velocity range of a vibration to be applied, and whether or not a blur correction function is normal is discriminated on the basis of an output value from the maximum/minimum displacement detecting unit, which is obtained using the gain adjustment value, which is changed in correspondence with the angle or angular velocity range of a predetermined vibration upon application of the predetermined vibration.

According to a 10th aspect of the present invention, there is provided a blur correction camera. The blur correction camera comprises: an optical axis changing unit for changing an optical axis of a photographing optical system so as to correct a blur generated by a vibration; a displacement detecting unit for detecting a displacement of the photographing optical system by the optical axis changing unit; an angular velocity detecting unit for detecting an angular velocity caused by the vibration; a gain correction unit for correcting a gain variation among devices in the angular velocity detecting unit on the basis of a gain adjustment value for adjusting a gain variation of output values among the devices of the angular velocity detecting unit; a first calculation unit for calculating a target displacement position of the optical axis changing unit by integrating or accumulating an output from the gain correction unit; and a second calculation unit for calculating a control error of the optical axis changing unit on the basis of an output from the displacement detecting unit and the target displacement position calculated by the first calculation unit during operation of the optical axis changing unit, and the camera operates such that the gain adjustment value is changed to a value corresponding to an angle or angular velocity range of a vibration to be applied, and whether or not a blur correction function is normal is discriminated on the basis of the control error calculated by the second calculation unit, which is obtained using the gain adjustment value, which is changed in correspondence with the angle or angular velocity range of a predetermined vibration upon application of the predetermined vibration.

Whether or not the blur correction function is normal is preferably discriminated on the basis of a maximum value and/or a minimum value of the control error.

According to an 11th aspect of the present invention, there is provided a method of inspecting a blur correction function of a blur correction camera, which comprises an optical axis changing unit for changing an optical axis of a photographing optical system so as to correct a blur generated by a vibration, a displacement detecting unit for detecting a displacement of the photographing optical system by the optical axis changing unit, a maximum/minimum displacement detecting unit for detecting maximum and minimum values of an output value from the displacement detecting unit, an angular velocity detecting unit for detecting an angular velocity caused by the vibration, and a gain correction unit for correcting a gain variation among devices in the angular velocity detecting unit on the basis of a gain adjustment value for adjusting a gain variation of output values among the devices of the angular velocity detecting unit. The method comprises the steps of: applying a predetermined vibration to the blur correction camera; changing the gain adjustment value of the blur correction camera to a value corresponding to an angle or angular velocity range of the applied predetermined vibration; and discriminating whether or not the blur correction function is normal, on the basis of an output value obtained from the maximum/ minimum displacement detecting unit using the changed gain adjustment value.

According to a 12th aspect of the present invention, there is provided a method of inspecting a blur correction function of a blur correction camera, which comprises an optical axis changing unit for changing an optical axis of a photographing optical system so as to correct a blur generated by a vibration, a displacement detecting unit for detecting a displacement of the photographing optical system by the optical axis changing unit, an angular velocity detecting unit for detecting an angular velocity caused by the vibration, a gain correction unit for correcting a gain variation among devices in the angular velocity detecting unit on the basis of a gain adjustment value for adjusting a gain variation of output values among the devices of the angular velocity detecting unit, a first calculation unit for calculating a target displacement position of the optical axis changing unit by integrating or accumulating an output from the gain correction unit, and a second calculation unit for calculating a control error of the optical axis changing unit on the basis of an output from the displacement detecting unit and the target displacement position calculated by the first calculation unit during operation of the optical axis changing unit. The method comprises the steps of: applying a predetermined vibration to the blur correction camera; changing the gain adjustment value of the blur correction camera to a value corresponding to an angle or angular velocity range of the applied predetermined vibration; and discriminating whether or not the blur correction function is normal, on the basis of the control error calculated by the second calculation unit using the changed gain adjustment value.

Whether or not the blur correction function of the blur correction camera is normal is preferably discriminated on the basis of a maximum value and/or a minimum value of the control error.

In the seventh to 12th aspects of the present invention, the gain adjustment value for adjusting a gain variation of output values among devices in the angular velocity detecting unit is calculated, and the gain variation is corrected based on this value. Furthermore, the gain adjustment value is changed to a value corresponding to an angle or angular velocity range of a vibration to be applied. Whether or not the blur correction function is normal is determined on the basis of a predetermined output value obtained using the changed gain adjustment value. Therefore, the variation among devices of the angular velocity detecting unit can be adjusted to perform blur correction with higher precision, and whether or not the blur correction function is normal can be checked in a state corresponding to an actual use state of the camera.

The above and other objects, features and advantages of the present invention are explained hereinafter and may be better understood by reference to the drawings and the descriptive matter which follows.

BRIEF DESCRIPTION OF THE DRAWINGS

FIGS. 8A and 8B show flow charts illustrating an embodiment of communication mode processing executed by a CPU 1 of a camera;

FIG. 18 is a flow chart showing an embodiment of half-depression processing according to the present invention.

DETAILED DESCRIPTION OF THE PREFERRED EMBODIMENTS

Figure 1:
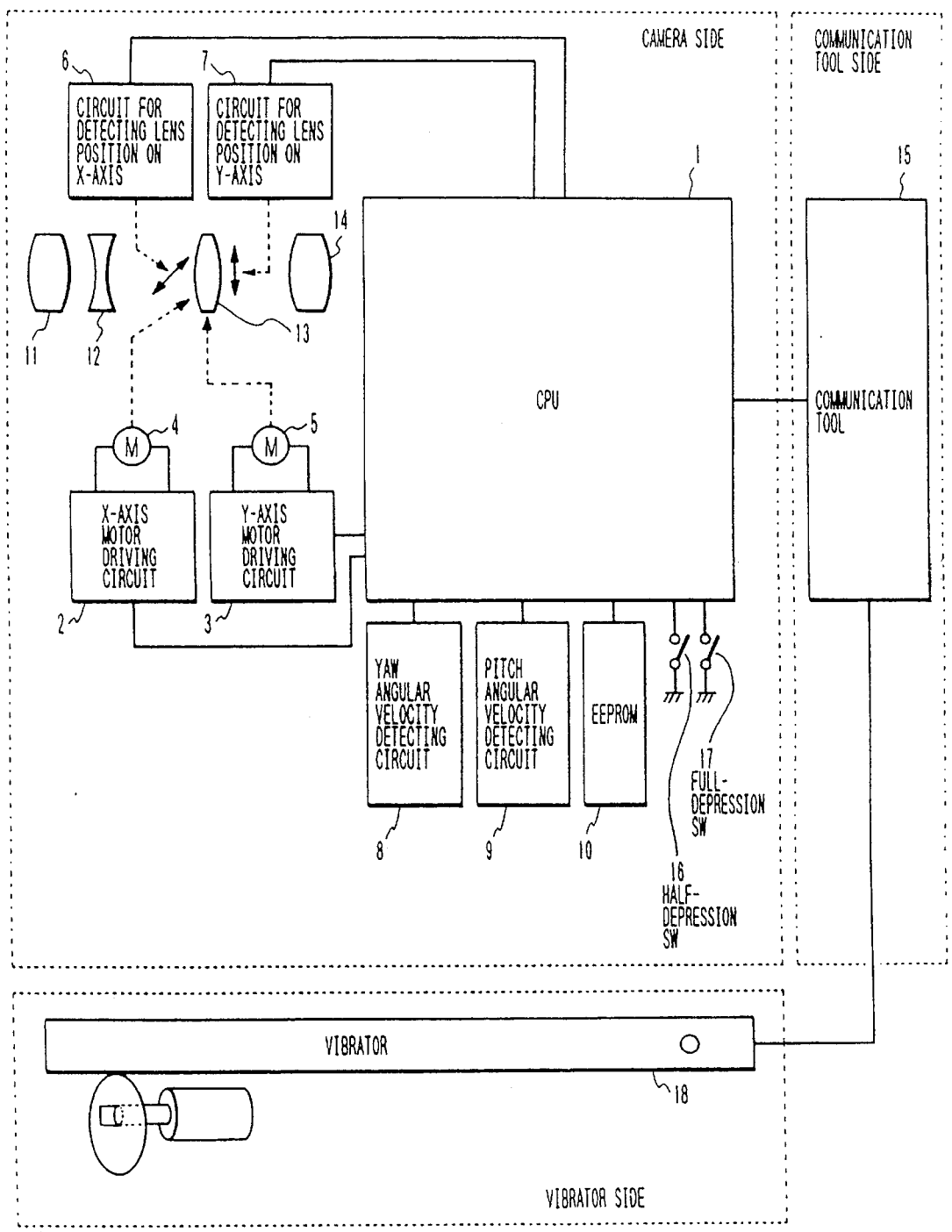
FIG. 1 is a block diagram showing the arrangements of a camera side portion, a communication tool side portion, and a vibrator side portion according to an embodiment of the present invention.

FIG. 1 is a diagram showing the arrangements of a camera side portion, a communication tool side portion, and a vibrator side portion according to an embodiment of the present invention. The camera side portion will be explained below.

A camera of this embodiment is includes photographing optical system components 11 to 14, a CPU 1, circuits 6 and 7 for detecting the lens positions on the X- and Y-axes, X- and Y-axis motor driving circuits 2 and 3, yaw and pitch angular velocity detecting circuits 8 and 9, and the like. The circuits 6 to 9, and the like are connected to the CPU 1.

The photographing optical system components 11 to 14 are constituted by four photographing lenses 11, 12, 13, and 14. Of these lenses, the photographing lens 13 serves as a lens for correcting an image blur caused by a camera shake (to be referred to as an "anti-vibration lens 13" hereinafter).

The yaw and pitch angular velocity detecting circuits 8 and 9 respectively detect angular velocities in the yaw and pitch directions as two-axis directions (X- and Y-axes) on a plane perpendicular to the photographing optical axis.

The CPU 1 is a one-chip microcomputer for, e.g., controlling the sequences of the camera, and has a calculation function of performing various calculations, a time measuring timer function of measuring a time, a timer interruption function of performing the processing at a predetermined time interval, a PWM output function of outputting an arbitrary duty, a function of A/D converting the outputs from the yaw and pitch angular velocity detecting circuits 8 and 9, a communication function with the communication tool side, a shutter function of performing exposure processing, and the like.

The X- and Y-axis motor driving circuits 2 and 3 respectively drive X- and Y-axis motors 4 and 5 to move the anti-vibration lens 13 in the X- and Y-axis directions.

The circuits 6 and 7 for detecting the lens positions on the X- and Y-axes respectively detect the positions, in the X- and Y-axis directions, of the anti-vibration lens 13.

An EEPROM 10, a half-depression switch (SW) 16, and a full-depression SW 17 are electrically connected to the CPU 1.

The EEPROM 10 is a nonvolatile memory, which stores gain adjustment values for correcting gain variations of the yaw and pitch angular velocity detecting circuits 8 and 9, detection angular deviation adjustment values for correcting detecting direction deviations of the angular velocities of the yaw and pitch angular velocity detecting circuits 8 and 9, and the like.

The half-depression SW 16 is turned on at the half-depression position of a release button.

The full-depression SW 17 is turned on at the full-depression position of the release button.

The operation of the camera will be described below.

The yaw and pitch angular velocity detecting circuits 8 and 9 detect angular velocities caused by, e.g., a camera shake of the camera. The output values from these circuits are transmitted to the CPU 1, and the CPU 1 A/D-converts these output values to detect the angular velocities of the camera shake. The CPU 1 performs predetermined calculations on the basis of the A/D-converted values, and the gain adjustment values, the detection angular deviation adjustment values, and the like stored in the EEPROM 10, thereby calculating proper driving amounts of the anti-vibration lens 13. Then, the CPU 1 controls the X- and Y-axis driving circuits 2 and 3 to drive X- and Y-axis motors 4 and 5. The rotational driving forces of the X- and Y-axis motors 4 and 5 are converted into linear motions by, e.g., gear trains, and the anti-vibration lens 13 is moved based on these linear motions at proper velocities in the X- and Y-axis directions so as to cancel an image blur on the imaging plane. When the anti-vibration lens 13 is moved, the CPU 1 controls the circuits 6 and 7 for detecting the lens positions on the X- and Y-axes to read the positions, in the X- and Y-axis directions, of the anti-vibration lens 13.

In the following description, a mechanism system for shifting the anti-vibration lens 13 upon rotation of the X- and Y-axis motors 4 and 5 will be referred to as an anti-vibration lens shift mechanism system.

The communication tool side is provided with a communication tool 15 which is electrically connected to the CPU 1 of the camera. The communication tool 15 performs various adjustments of the camera in synchronism with the operation of the camera by exchanging information with the CPU 1.

The vibrator side is provided with a vibrator 18 which is electrically connected to the communication tool 15. The vibrator 18 applies a vibration to the camera. In a state wherein the camera is attached to the vibrator 18, the vibrator 18 substantially sinusoidally vibrates in the X- and Y-axis directions as shift directions of the anti-vibration lens 13 in response to a command from the communication tool 15.

Adjustment of gain variations in angular velocity detection and deviation adjustment of the detection angles of the angular velocities will be explained below.

(1) Method of gain adjustment and angular deviation correction

Figure 2:
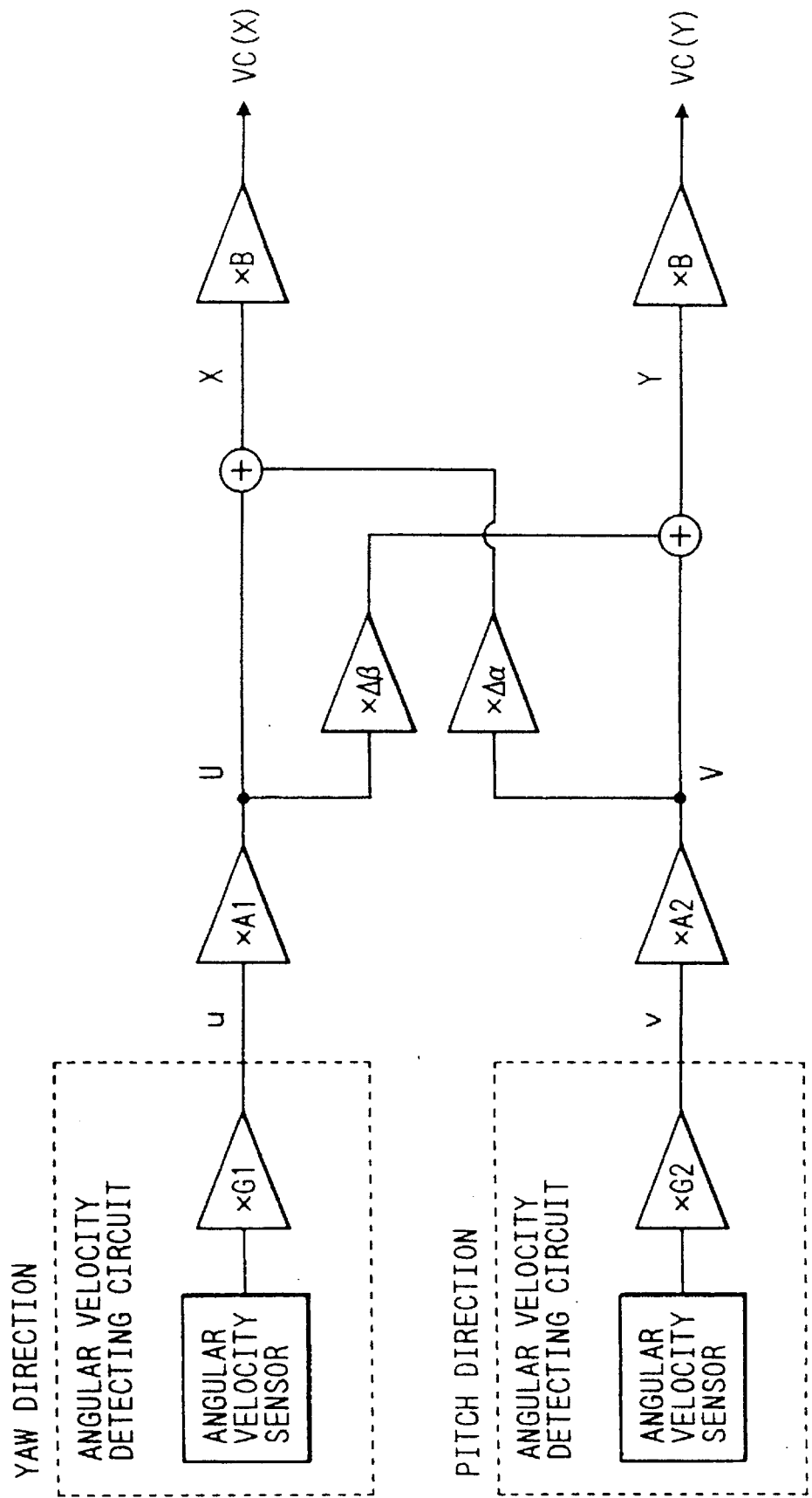
FIG. 2 is a diagram illustrating gain variations of yaw and pitch angular velocity detecting circuits 8 and 9.

Each of the yaw and pitch angular velocity detecting circuits 8 and 9 is constituted by an angular velocity sensor, an amplifier for amplifying a signal output from the sensor, and the like. Gain variation factors include a variation in output from the angular velocity sensor and a gain variation of the amplifier, and also includes, of example, a variation of the A/D converter, in each individual CPU 1, or a variation in reference voltage used for the A/D conversion, in the camera where CPU 1 performs A/D conversion, such as in this embodiment. FIG. 2 illustrates gain variations of the yaw and pitch angular velocity detecting circuits 8 and 9. In FIG. 2, gain variation factors in each of the yaw and pitch directions are represented by one factor G1 or G2.

Figure 3:
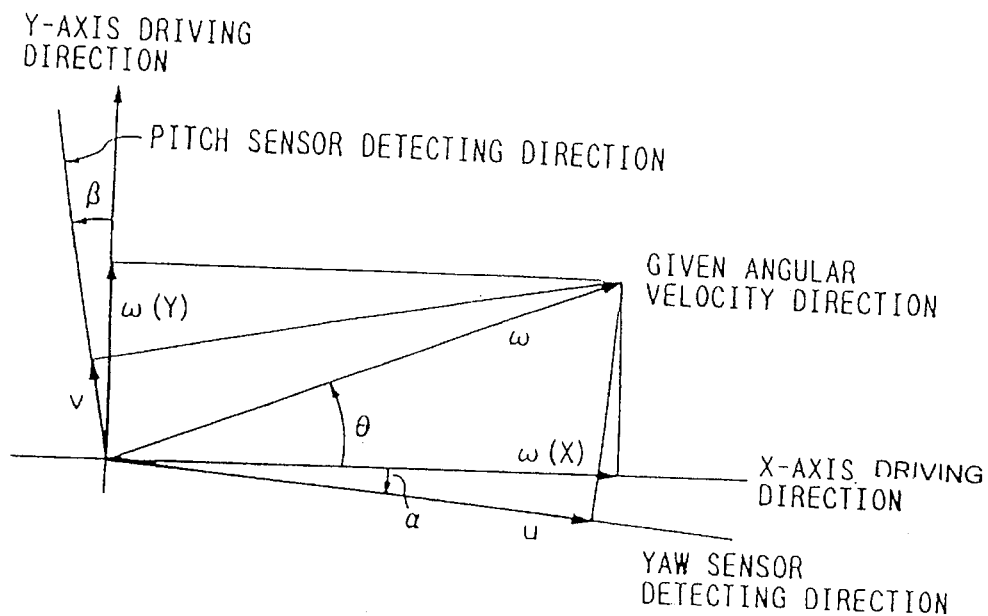
FIG. 3 is a graph for explaining an angular deviation.

The detecting directions of the angular velocities of the yaw and pitch angular velocity detecting circuits 8 and 9 do not precisely coincide with the moving directions of the anti-vibration lens 13 based on the outputs from the yaw and pitch angular velocity detecting circuits 8 and 9, and errors due to angular deviations occur therebetween. FIG. 3 is a view for explaining these angular deviations.

In FIG. 3, the abscissa and ordinate respectively represent the X- and Y-axis driving directions of the anti-vibration lens 13. Assume that the X-axis driving direction deviates from the detecting direction of the angular velocity of the yaw angular velocity detecting circuit 8 by an angle $\alpha$, while the Y-axis driving direction deviates from the detecting direction of the angular velocity of the pitch angular velocity detecting circuit 9 by an angle $\beta$. In this case, when an angular velocity is applied as a vector $\omega$ (an angular velocity having a magnitude $\omega$ and tilted by $\theta$ counterclockwise from the X-axis driving direction) by a camera shake, outputs u and v of the yaw and pitch angular velocity detecting circuits 8 and 9 are respectively calculated by the following equations (1) and (2):

$$u = G1 \times \omega \times \cos(\theta + \alpha) \quad (1)$$

$$v = G2 \times \omega \times \sin(\theta - \beta) \quad (2)$$

Note that the gain variations G1 and G2 are respectively set to be G1=G2=1 in FIG. 3 for the sake of easy understanding.

When the angular velocity applied to the camera has a magnitude $\omega 1$ and its direction coincides with the X-axis direction (i.e., $\theta = 0$), outputs u1 and v1 from the yaw and pitch angular velocity detecting circuits 8 and 9 are respectively calculated by the following equations (3) and (4):

$$u1 = G1 \times \omega1 \times \cos(\alpha) \quad (3)$$

$$v1 = -G2 \times \omega1 \times \sin(\beta) \quad (4)$$

When the angular velocity applied to the camera has a magnitude $\omega2$ and its direction coincides with the Y-axis direction (i.e., $\theta=90°$), outputs u2 and v2 from the yaw and pitch angular velocity detecting circuits 8 and 9 are respectively calculated by the following equations (5) and (6):

$$u2 = -G1 \times \omega2 \times \sin(\alpha) \quad (5)$$

$$v2 = G2 \times \omega2 \times \cos(\beta) \quad (6)$$

From equations (3) and (6), the gain variations G1 and G2 of the yaw and pitch angular velocity detecting circuits 8 and 9 are calculated by the following equations (7) and (8):

$$G1 = u1/(\omega1 \times \cos(\alpha)) \quad (7)$$

$$G2 = v2/(\omega2 \times \cos(\beta)) \quad (8)$$

Since angular deviations $\alpha$ and $\beta$ of the detecting directions with respect to the X- and Y-axes are at most about 5°, they can be approximated with an error of about 0.4% even when $\cos(\alpha)=1$ and $\cos(\beta)=1$. Therefore, equations (7) and (8) can be approximated like the following equations (9) and (10):

$$G1 = u1/\omega1 \quad (9)$$

$$G2 = v2/\omega2 \quad (10)$$

As described above, the gain variations G1 and G2 can be calculated based on the output values from the yaw and pitch angular velocity detecting circuits 8 and 9 obtained when predetermined angular velocities are applied in the X- and Y-axis directions. In FIG. 2, G1 and G2 are calculated by the above-mentioned method, and the gain variations are corrected by respectively multiplying the output values from the yaw and pitch angular velocity detecting circuits 8 and 9 with a gain adjustment value A1 in the yaw direction, which is proportional to the reciprocal of G1, and a gain adjustment value A2 in the pitch direction, which is proportional to the reciprocal of G2. Output values U and V from the yaw and pitch angular velocity detecting circuits 8 and 9 after gain variation correction are calculated by the following equations (11) and (12):

$$U = A1 \times G1 \times \omega \times \cos(\theta+\alpha) \quad (11)$$

$$V = A2 \times G2 \times \omega \times \sin(\theta-\beta) \quad (12)$$

From equations (3) and (5), and equations (4) and (6), the detection angular deviations $\alpha$ and $\beta$ are calculated by the following equations (13) and (14):

$$\tan(\alpha) = -(\omega1/\omega2) \times (u2/u1) \quad (13)$$

$$\tan(\beta) = -(\omega2/\omega1) \times (v1/v2) \quad (14)$$

Since the detecting direction deviations $\alpha$ and $\beta$ with respect to the X- and Y-axes are at most about 5°, they can be approximated with an error of about 0.4% even when $\cos(\alpha)=1$ and $\cos(\beta)=1$. Therefore, equations (13) and (14) can be approximated like the following equations (15) and (16):

$$\sin(\alpha) = -(\omega1/\omega2) \times (u2/u1) \quad (15)$$

$$\sin(\beta) = -(\omega2/\omega1) \times (v1/v2) \quad (16)$$

As described above, the angular deviations $\alpha$ and $\beta$ of the detecting directions of the yaw and pitch angular velocity detecting circuits 8 and 9 can be detected based on the output values from the yaw and pitch angular velocity detecting circuits 8 and 9 obtained when predetermined angular velocities are applied in the X- and Y-axis directions, respectively.

A method of correcting the angular deviations in an actual camera when the gain variations G1 and G2 and the angular deviations $\alpha$ and $\beta$ are calculated by the above-mentioned method will be explained below. For the sake of simplicity, when equations (11) and (12) are normalized assuming $A1 \times G1 = 1$ and $A2 \times G2 = 1$, the output values U and V from the yaw and pitch angular velocity detecting circuits 8 and 9 after gain variation correction can be expressed by the following equations (17) and (18):

$$U = \omega \times \cos(\theta+\alpha) \quad (17)$$

$$V = \omega \times \sin(\theta-\beta) \quad (18)$$

Angular velocities X and Y in the X- and Y-axis directions are calculated by the following equations (19) and (20):

$$X = \omega \times \cos(\theta) \quad (19)$$

$$Y = \omega \times \sin(\theta) \quad (20)$$

When equations (17) and (18) are rewritten as ones independent from $\theta$, they can be expressed by the following equations (21) and (22):

$$X = (\cos(\beta)/\cos(\alpha+\beta)) \times U + (\sin(\alpha)/\cos(\alpha+\beta)) \times V \quad (21)$$

$$Y = (\cos(\alpha)/\cos(\alpha+\beta)) \times V + (\sin(\beta)/\cos(\alpha+\beta)) \times U \quad (22)$$

Since the detecting direction deviations $\alpha$ and $\beta$ with respect to the X- and Y-axes are at most about 5°, equations (21) and (22) can be approximated like the following equations (23) and (24) by approximations of $\cos(\alpha)=1$, $\cos(\beta)=1$, and $\cos(\alpha+\beta)=1$:

$$X = U + \sin(\alpha) \times V \quad (23)$$

$$Y = V + \sin(\beta) \times U \quad (24)$$

More specifically, when the gain variations are calculated by equations (9) and (10), and the sin values of the angular deviations are calculated by equations (15) and (16), the gain variations G1 and G2 and the angular deviations $\alpha$ and $\beta$ can be corrected by equations (23) and (24).

The correction state of the gain variations G1 and G2 and the angular deviations $\alpha$ and $\beta$ will be described below with reference to FIG. 2.

The outputs u and v from the yaw and pitch angular velocity detecting circuits 8 and 9 with the gain variations G1 and G2 are respectively multiplied with the gain adjustment values A1 and A2, thus obtaining gain-adjusted outputs U and V. A sum of U and an output obtained by multiplying V with an angular deviation adjustment value $\Delta\alpha$ is represented by X, and a sum of V and an output obtained by multiplying U with an angular deviation adjustment value $\Delta\beta$ is represented by Y. Note that the angular deviation adjustment values $\Delta\alpha = \sin(\alpha)$ and $\Delta\beta = \sin(\beta)$. More specifically, with the arrangement shown in FIG. 2, the angular velocities X and Y in the X- and Y-axis directions can be obtained. Thereafter, the angular velocities X and Y are multiplied with B to obtain target velocities (to be referred to as "anti-vibration lens target velocities" hereinafter) Vc(X) and Vc(Y) upon shifting of the anti-vibration lens 13 in the X- and Y-axis directions. Note that B is a coefficient for determining the shift velocities of the anti-vibration lens 13 with respect to the predetermined angular velocities (to be referred to as an "angular velocity-anti-vibration lens target velocity conversion coefficient" hereinafter). More specifically, by multiplying the calculated angular velocities X and Y in the respective driving axis directions with B, the anti-vibration lens target velocities Vc(X) and Vc(Y) in the respective directions are calculated. When the anti-vibration lens target velocities Vc(X) and Vc(Y) are calculated, an image blur on the imaging plane can be canceled by shifting the anti-vibration lens 13 at the calculated velocities.

(2) Adjustment method using vibrator for changing angular velocities sinusoidally In the above description, gain adjustment and angular deviation adjustment can be attained by continuously applying predetermined angular velocities to the camera, and detecting the output values from the yaw and pitch angular velocity detecting circuits 8 and 9 at that time. However, it is very difficult to precisely apply predetermined angular velocities to the camera in practice. This is because, in order to precisely apply predetermined angular velocities to the camera, the camera must be fixed at a position separated by a predetermined distance from a given point as the center of rotation, and must be rotated at equal speed. In view of this, gain adjustment and angular deviation adjustment are attained by applying angular velocities which change sinusoidally to the camera using the vibrator 18.

A vibration applying portion of the vibrator 18 is fixed near its one end, and an appropriately flattened cam is arranged below a portion near the opposite end. The cam is rotated by, e.g., a motor, and the vibration applying portion is vertically moved sinusoidally. The vibrator 18 has this mechanism in two directions, and the camera is attached, so that the X- and Y-axis driving directions of the anti-vibration lens 13 coincide with the vibration applying directions. In practice, although a small angular deviation is present between each driving direction of the anti-vibration lens 13 and the corresponding vibration applying direction, this angular deviation is negligible as compared to the angular deviations in question of the present invention.

Figure 4:
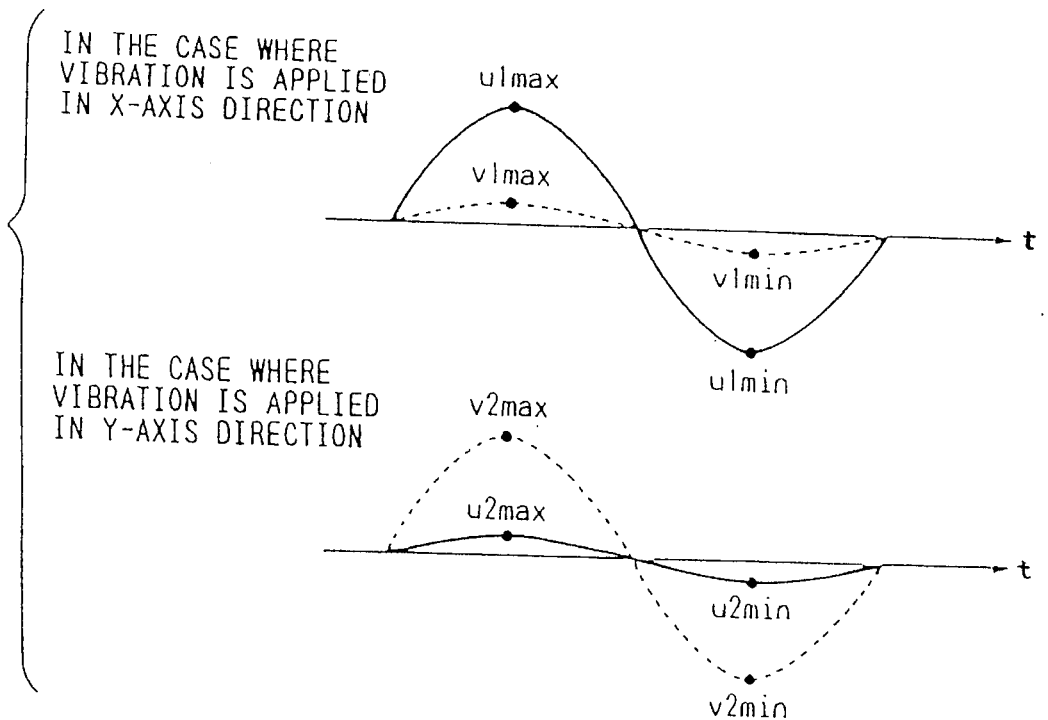
FIG. 4 is a chart showing the state of gain adjustment and detection angular deviation adjustment according to the present invention.
Figure 5:
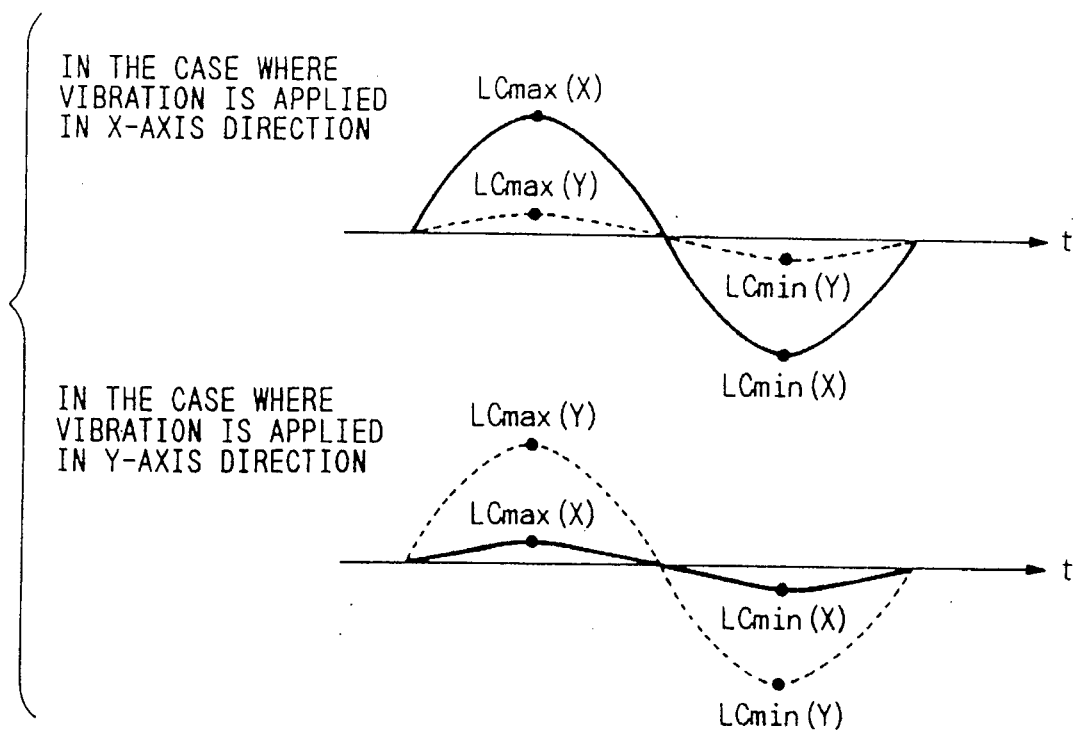
FIG. 5 is a chart showing the state of gain adjustment and detection angular deviation adjustment according to the present invention.

An embodiment for attaining gain adjustment and angular deviation adjustment by applying sinusoidal angular velocities to the camera will be described below with reference to FIG. 4. FIG. 4 shows the state of gain adjustment and angular deviation adjustment according to the present invention.

First, the vibrator 18 applies a sinusoidal angular velocity with a total amplitude $\omega 1$ to the camera in the X-axis driving direction of the anti-vibration lens 13. Maximum and Minimum values of the outputs from the yaw angular velocity detecting circuit 8 at that time are respectively represented by $u1\max$ and $u1\min$, and those of the outputs from the pitch angular velocity detecting circuit 9 are respectively represented by $v1\max$ and $v1\min$. Then, the vibrator 18 applies a sinusoidal angular velocity with a total amplitude $\omega 2$ to the camera in the Y-axis driving direction of the anti-vibration lens 13. Maximum and Minimum values of the outputs from the yaw angular velocity detecting circuit 8 at that time are respectively represented by $u2\max$ and $u2\min$, and those of the outputs from the pitch angular velocity detecting circuit 9 are respectively represented by $v2\max$ and $v2\min$.

Gain variations at that time can be considered in the same manner as in the above-mentioned case wherein predetermined angular velocities are applied. When sinusoidal angular velocities are applied, the gain variations are calculated as the ratios of the total amplitudes of the applied angular velocities to those of the output values, as shown in the following equations (25) and (26):

$$G1=(u1\max-u1\min)/\omega 1 \quad (25)$$

$$G2=(v2\max-v2\min)/\omega 2 \quad (26)$$

Therefore, the gain adjustment values A1 and A2 are respectively calculated as values proportional to the reciprocals of G1 and G2. Alternatively, the gain adjustment values are given as the ratios of the target total amplitudes to be obtained of outputs from the yaw and pitch angular velocity detecting circuits 8 and 9 after gain adjustment to the total amplitudes $\omega 1$ and $\omega 2$ of the applied angular velocities. When the target total amplitudes to be obtained of the outputs from the yaw and pitch angular velocity detecting circuits 8 and 9 after gain adjustment are respectively U1 and V1, the gain adjustment values A1 and A2 are calculated by the following equations (27) and (28):

$$A1=U1/(u1\max-u1\min) \quad (27)$$

$$A2=V1/(v2\max-v2\min) \quad (28)$$

The angular deviations of the detecting directions of the yaw and pitch angular velocity detecting circuits 8 and 9 can be considered in the same manner as in the above-mentioned case wherein predetermined angular velocities are applied. When sinusoidal angular velocities are applied, the angular deviations are respectively calculated by the following equations (29) and (30):

$$\sin(\alpha) = -f^*(\omega 1/\omega 2) \times \{(u2\max - u2\min)/(u1\max - u1\min)\} \quad (29)$$

$$\sin(\beta) = -c^*(\omega 2/\omega 1) \times \{(v1\max - v1\min)/(v2\max - v2\min)\} \quad (30)$$

where c and f are respectively given by the following equations (31) and (32):

$$c = \begin{cases} +1 \begin{pmatrix} \text{when } v1 \text{ upon detection of } u1 \text{ maximum} \\ \text{value upon application of vibration} \\ \text{in X-axis is positive} \end{pmatrix} \\ -1 \begin{pmatrix} \text{when } v1 \text{ upon detection of } u1 \text{ maximum} \\ \text{value upon application of vibration} \\ \text{in X-axis is negative} \end{pmatrix} \end{cases} \quad (31)$$

$$f = \begin{cases} +1 \begin{pmatrix} \text{when } u2 \text{ upon detection of } v2 \text{ maximum} \\ \text{value upon application of vibration} \\ \text{in Y-axis is positive} \end{pmatrix} \\ -1 \begin{pmatrix} \text{when } u2 \text{ upon detection of } v2 \text{ maximum} \\ \text{value upon application of vibration} \\ \text{in Y-axis is negative} \end{pmatrix} \end{cases} \quad (32)$$

Since the values of the total amplitudes calculated from the maximum and minimum values upon application of sinusoidal angular velocities to the camera are always positive, the signs of the angular deviations are unknown. In order to prevent this, in equation (31), when the angular velocity applied in the X-axis direction is positive, since the output from the pitch angular velocity detecting circuit 9 upon detection of the maximum value $u1\max$ of the output value of the yaw angular velocity detecting circuit 8 has the same sign, the sign of the angular deviation is detected by utilizing the above relation (the same applies to equation (32)). In this embodiment, in order to detect the sign of the angular deviation, the above-mentioned method is adopted for the sake of simplicity. Alternatively, by comparing the sign of the output from the angular velocity detecting circuit in the other direction upon detection of the minimum value or the sign of the angular velocity applied by the vibrator 18 with the signs of the outputs from the yaw and pitch angular velocity detecting circuits 8 and 9, the sign of the angular deviation may be detected.

A problem which may be encountered in this case is that when gain adjustment and angular deviation adjustment are performed by applying angular velocities, which change sinusoidally, to the camera using the vibrator 18, the maximum and minimum values cannot be calculated with high precision unless the vibrator 18 is controlled with high precision. This is accounted for by the following two reasons. First, when the frequency of the angular velocity applied by the vibrator 18 varies due to a nonuniformity of the rotational speed of the driving motor for the vibrator 18, the total amplitudes of the output values of the yaw and pitch angular velocities detecting circuits 8 and 9 vary in proportion to the variation amount, and the gain adjustment values and the angular deviation adjustment values include errors accordingly. Second, when the vibrator 18 does not operate smoothly and makes a motion on which a high-frequency vibration is superposed, noise corresponding to the high-frequency vibration is superposed on the output values from the yaw and pitch angular velocity detecting circuits 8 and 9. For this reason, errors are generated in detection of the maximum and minimum values of the output values of each angular velocity detecting circuit, and hence, the gain adjustment values and the angular deviation adjustment values include errors accordingly. Thus, a method of solving this problem will be described below. Note that when the above-mentioned adjustments are performed using a high-precision vibrator, and the above-mentioned problem is not posed, the above-mentioned adjustment method can be adopted, as a matter of course.

(3) Adjustment method using integrated value of angular velocity

The above-mentioned adjustment method uses a dimension of angular velocity. However, an adjustment method to be described below uses a dimension of angle or position.

First, initial values of the gain adjustment values in the yaw and pitch directions are set, as shown in equation (33) below, and the angular deviation adjustment values $\Delta\alpha$ and $\Delta\beta$ are cleared, as shown in equation (34):

$$A1 = A2 = A0 \tag{33}$$

$$\Delta\alpha = \Delta\beta = 0 \tag{34}$$

Then, angular velocities X and Y in the respective detecting directions, which are not subjected to gain adjustment and angular deviation correction, as in FIG. 2, are output. Anti-vibration lens target velocities $Vc(X)$ and $Vc(Y)$ in the X- and Y-axis directions, which are obtained by multiplying the above-mentioned outputs with B, are integrated, as shown in equations (35) and (36) below, thereby calculating target positions $LC(X)$ and $LC(Y)$, in the X- $\Delta$ and Y-axis directions, of the anti-vibration lens 13:

$$LC(X) = \int Vc(X) \tag{35}$$

$$LC(Y) = \int Vc(Y) \tag{36}$$

On the other hand, in place of the integral forms in equations (35) and (36), it is often preferable to calculate the target positions $LC(X)$ and $LC(Y)$ of the anti-vibration lens 13 by accumulating the values $Vc(X)$ and $Vc(Y)$ at predetermined time intervals, for example, when the outputs from the yaw and pitch angular velocity detecting circuits 8 and 9 are A/D-converted by the CPU 1, and the subsequent processing is controlled using digital values. In such a case, the target positions $LC(X)$ and $LC(Y)$ of the anti-vibration lens 13 may be calculated by accumulation.

In this case, the vibrator 18 applies a sinusoidal vibration with a total angular amplitude $\gamma 1$ to the camera in the X-axis direction of the anti-vibration lens 13. When maximum and minimum values of $LC(X)$ at that time are respectively represented by $LC\max(X)$ and $LC\min(X)$, and those of $LC(Y)$ are respectively represented by $LC\max(Y)$ and $LC\min(Y)$, total amplitudes a and b of the anti-vibration lens target positions in the X- and Y-axes are calculated by the following equations (37) and (38). Furthermore, c is calculated by equation (39) by the sign of $LC(Y)$ upon detection of $LC\max(X)$.

$$a = LC\max(X) - LC\min(X) \tag{37}$$
$$b = LC\max(Y) - LC\min(Y) \tag{38}$$

$$c = \begin{cases} +1 & \left(\begin{array}{l}\text{when } LC(Y) \text{ upon detection of} \\ LC\max(X) \text{ is positive}\end{array}\right) \\ -1 & \left(\begin{array}{l}\text{when } LC(Y) \text{ upon detection of} \\ LC\max(X) \text{ is negative}\end{array}\right) \end{cases} \tag{39}$$

Then, the vibrator 18 applies a sinusoidal vibration with a total angular amplitude $\gamma 2$ to the camera in the Y-axis driving direction of the anti-vibration lens 13. When maximum and minimum values of $LC(X)$ at that time are respectively represented by $LC\max(X)$ and $LC\min(X)$, and those of $LC(Y)$ are respectively represented by $LC\max(Y)$ and $LC\min(Y)$, total amplitudes d and e of the anti-vibration lens target positions in the X- and Y-axes are calculated by equations (40) and (41) below. Furthermore, f is calculated by equation (42) from the sign of $LC(X)$ upon detection of $LC\max(Y)$.

$$d = LC\max(X) - LC\min(X) \tag{40}$$
$$e = LC\max(Y) - LC\min(Y) \tag{41}$$

$$f = \begin{cases} +1 & \left(\begin{array}{l}\text{when } LC(X) \text{ upon detection of} \\ LC\max(Y) \text{ is positive}\end{array}\right) \\ -1 & \left(\begin{array}{l}\text{when } LC(X) \text{ upon detection of} \\ LC\max(Y) \text{ is negative}\end{array}\right) \end{cases} \tag{42}$$

When the total amplitudes to be obtained after gain adjustment of the anti-vibration lens target positions $LC(X)$ and $LC(Y)$ in the X- and Y-axis directions with respect to the total angular amplitudes $\gamma 1$ and $\gamma 2$ applied by the vibrator 18 are respectively represented by L01 and L02, the gain adjustment values A1 and A2 are calculated by the following equations (43) and (44). Note that L01 and L02 are proportional to the applied total angular amplitudes $\gamma 1$ and $\gamma 2$, and represent the total amplitudes of proper shifts of the anti-vibration lens 13 to stop an image against the applied total angular amplitudes. These values are determined by the photographing optical system, and theoretical values have been calculated.

$$A1 = A0 \times L01/a \tag{43}$$

$$A2 = A0 \times L02/e \tag{44}$$

Equations (43) and (44) transform the angular velocities given by equations (27) and (28) into a dimension of anti-vibration lens target positions as their integrated values. In each of these equations, a coefficient to be multiplied with the initial value A0 of the gain adjustment value is calculated from the ratio of the anti-vibration lens amplitude to be obtained when the gain adjustment value is the initial value A0 to the amplitude of the anti-vibration lens target position before gain adjustment, and is multiplied with A0, thus calculating the gain adjustment value.

The angular deviation correction amounts $\Delta\alpha$ and $\Delta\beta$ of the detecting directions of the yaw and pitch angular velocity detecting circuits 8 and 9 are calculated by the following equations (45) and (46):

$$\Delta\alpha = \sin(\alpha) = -f^*(L01/L02) \times (d/a) \quad (45)$$

$$\Delta\beta = \sin(\beta) = -c^*(L02/L01) \times (b/e) \quad (46)$$

Equations (45) and (46) transform the angular velocities given by equations (29) and (30) into a dimension of anti-vibration lens target positions as their integrated values.

With the above-mentioned method, when gain adjustment and angular deviation adjustment are performed based on the integrated values of the outputs from the yaw and pitch angular velocity detecting circuits 8 and 9, the angular amplitudes of the vibrator 18 undergo almost no change even when the frequency of the vibrator 18 slightly varies. Even when vibration noise is superposed upon application of the vibration of the vibrator 18, and appears in the outputs from the yaw and pitch angular velocity detecting circuits 8 and 9, since the adjustment values are calculated based on the integrated values of the outputs from the circuits 8 and 9, adjustment almost free from the influence of noise can be realized.

An embodiment of adjustment processing of an actual camera will be explained below. The adjustment processing is classified into communication tool adjustment processing executed at the communication tool side, and camera communication mode processing executed at the camera side. First, the overall adjustment will be briefly described. As shown in FIG. 1, the CPU 1 of the camera is electrically connected to the communication tool 15, and the adjustment processing of the camera is performed. In the following description, the motors 4 and 5 are assumed to be controlled by PWM (PULSE WIDTH MODULATION) control. Normally, the PWM control is a method of performing speed control by varying the energization time of a predetermined period, i.e., by varying the ON duties of the motors 4 and 5.

Figure 7:
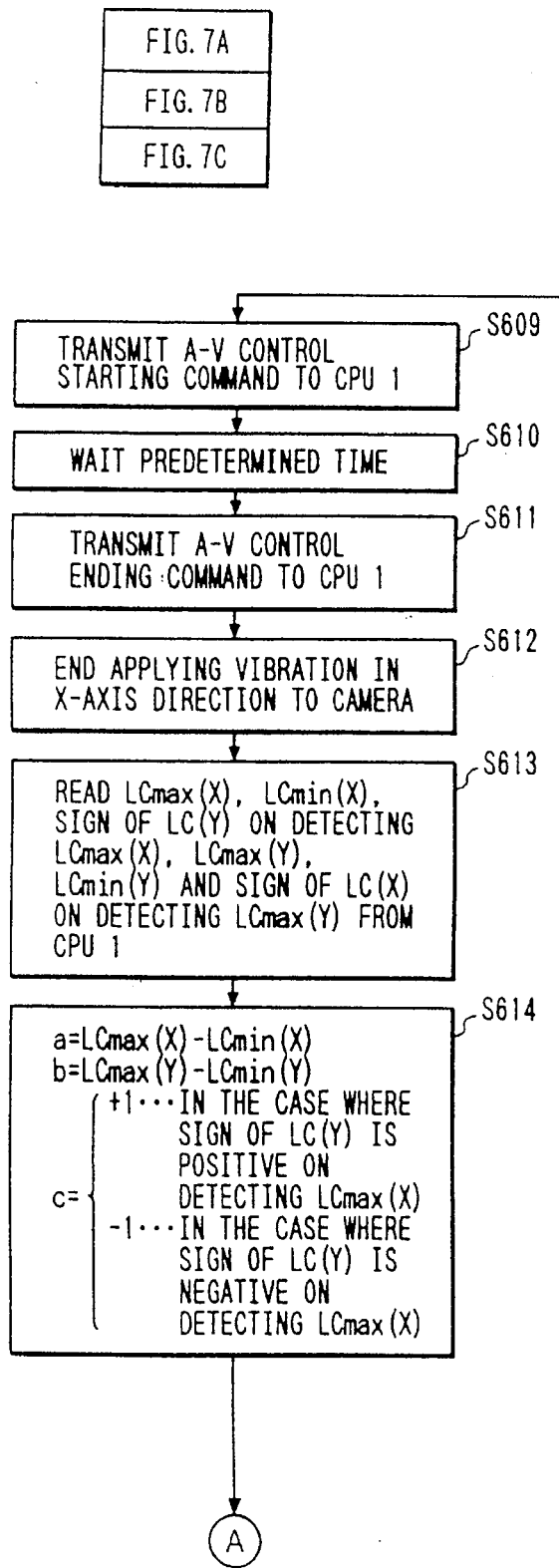
FIGS. 7A, 7B, and 7C show flow charts illustrating an embodiment of communication adjusting processing executed by a communication tool 15.
Figure 7:
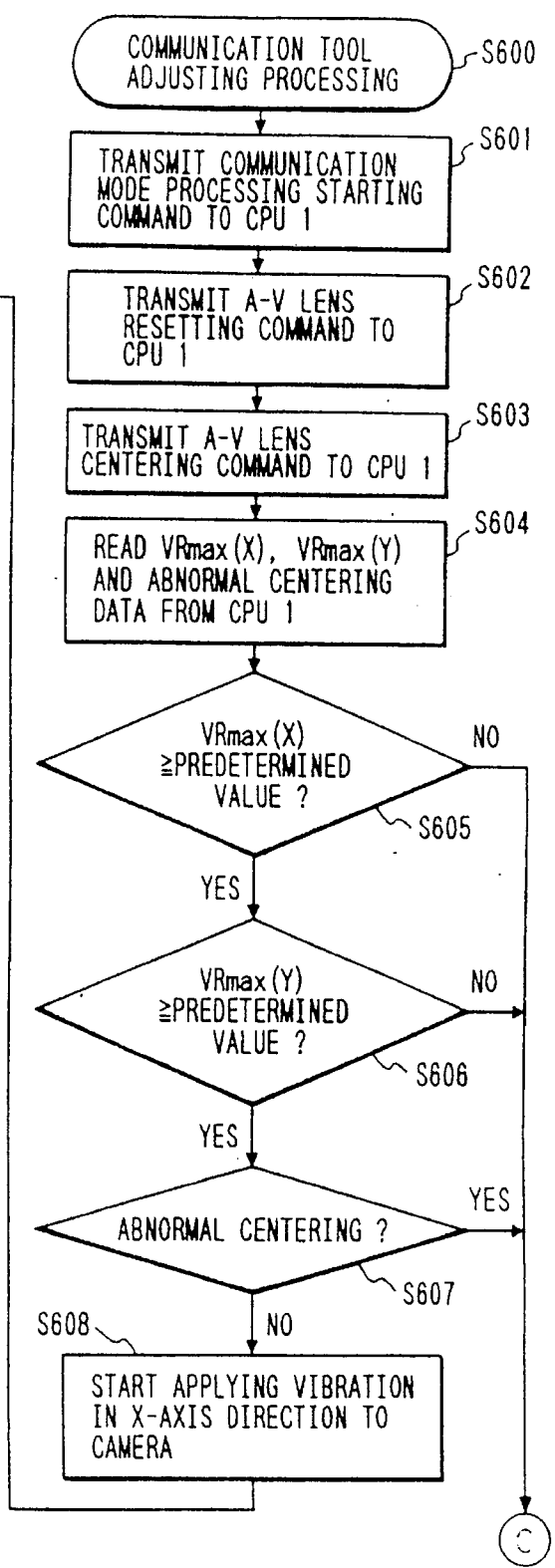
Figure 7B:
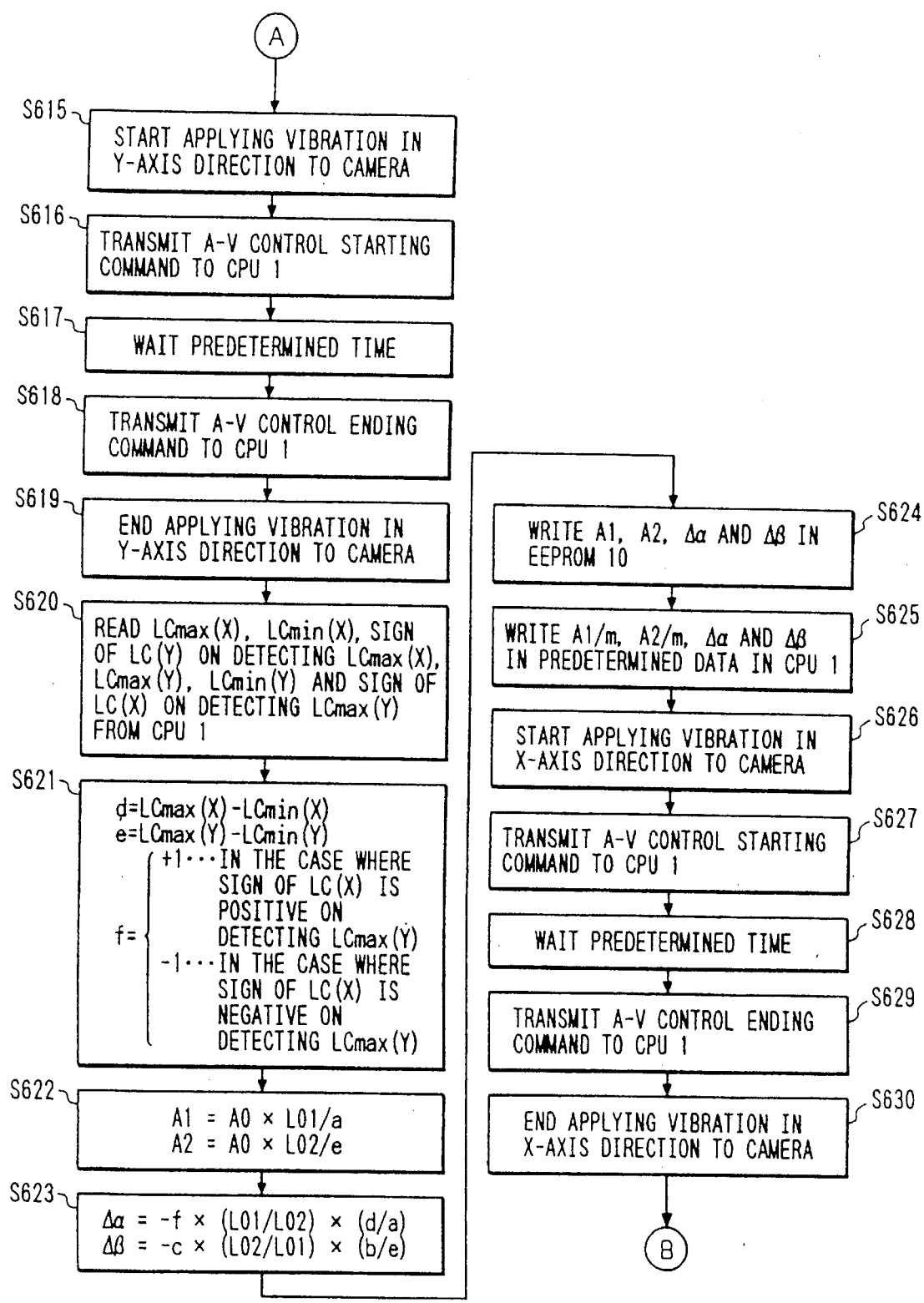
Figure 7C:
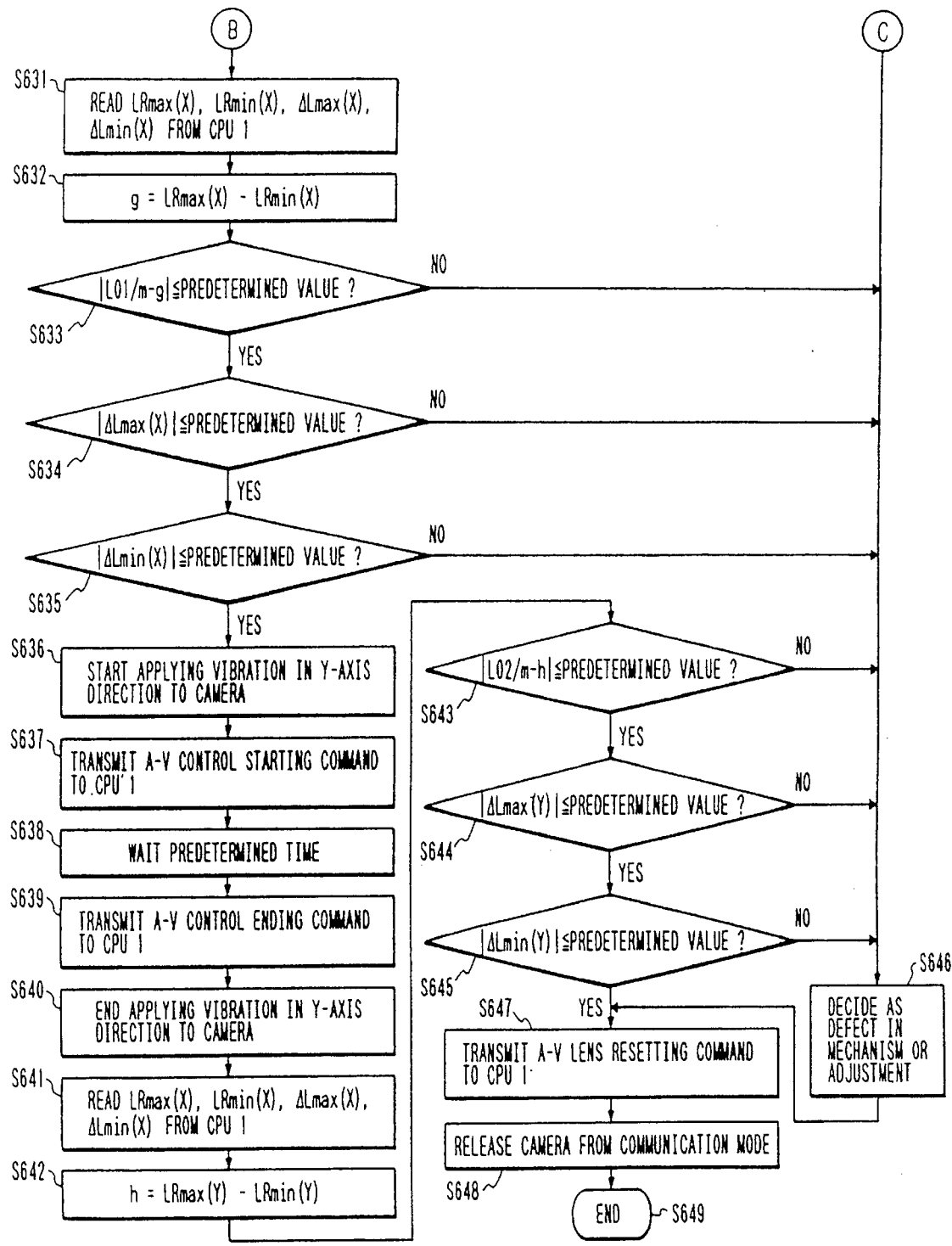

FIGS. 7A, 7B, and 7C are flow charts showing an embodiment of communication adjustment processing executed by the communication tool 15. The communication tool 15 checks a defect of the anti-vibration lens shift mechanism system in steps S602 to S607, and performs gain adjustment and detection angular deviation adjustment of the yaw and pitch angular velocity detecting circuits 8 and 9 in the following steps S608 to S624. Furthermore, the communication tool 15 systematically checks anti-vibration controllability in steps S625 to S646. Note that "A-V" in the flow charts means "ANTI-VIBRATION".

Figure 8B:
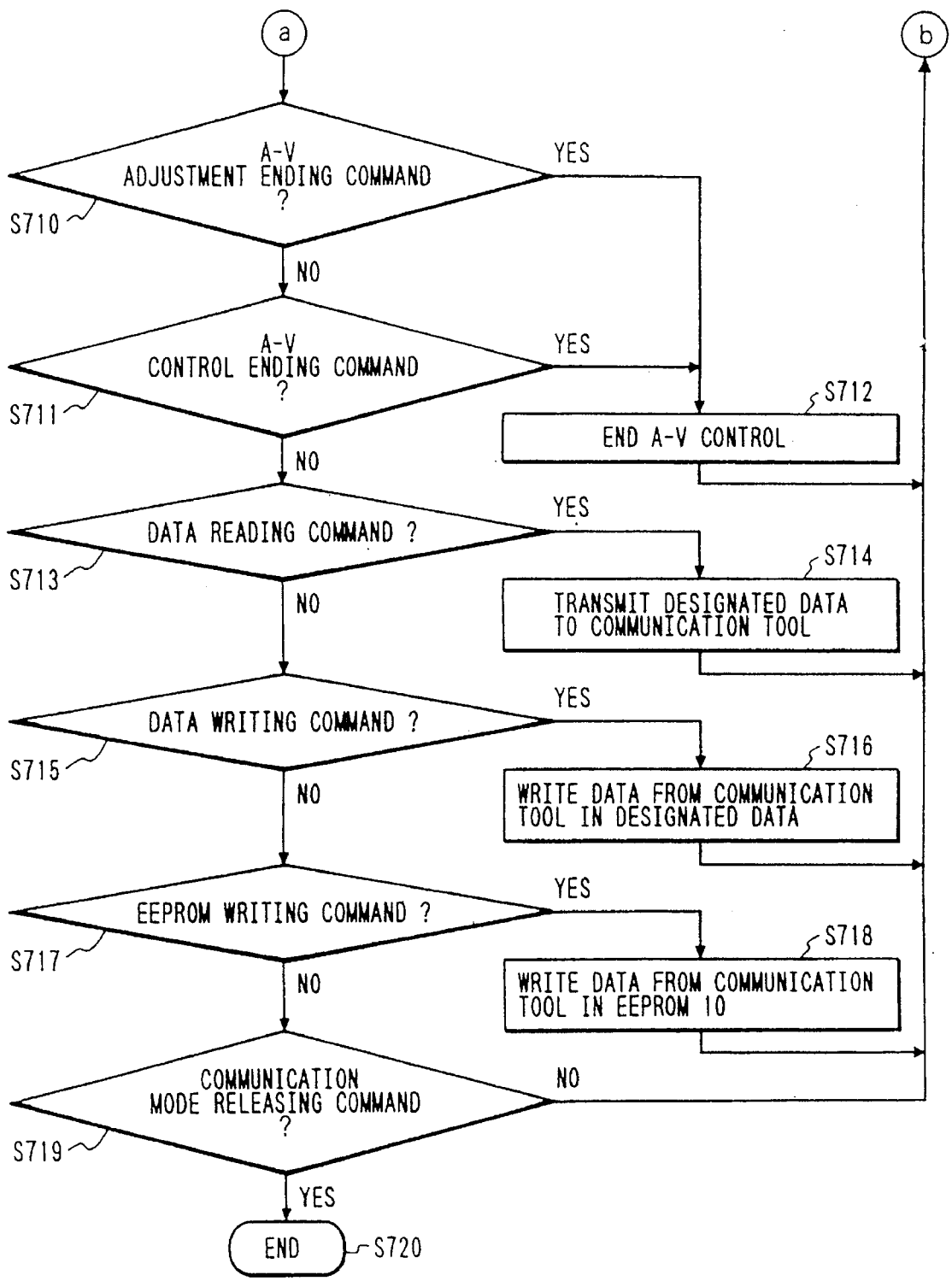

FIGS. 8A and 8B are flow charts showing an embodiment of communication mode processing executed by the CPU 1 of the camera. The CPU 1 of the camera starts the communication mode processing of the camera in response to a command from the communication tool 15. Then, the CPU 1 executes, e.g., anti-vibration lens resetting processing in step S704 and anti-vibration control starting processing in step S709 in accordance with commands from the communication tool 15.

(1) Processing at the camera side

The communication mode processing at the camera side will be described in detail below with reference to FIGS. 8A and 8B.

When communication tool processing is started in step S600 in FIG. 7A, the communication tool 15 transmits a communication mode processing starting command to the CPU 1 of the camera in step S601. In response to this command, the CPU 1 of the camera starts the communication mode processing in step S700 in FIG. 8A, and the flow advances to step S701.

In step S701, the angular velocity gain adjustment values A1 and A2 are set to be an initial value A0 by equation (33). In step S702, the angular deviation adjustment values $\Delta\alpha$ and $\Delta\beta$ are cleared by equation (34), and the flow advances to step S703. In the processing from step S703 to step S718, the flow branches depending on the type of command supplied from the communication tool 15, and the corresponding processing is executed. First, it is checked in step S703 if an anti-vibration lens resetting command is received. If YES in step S703, anti-vibration lens resetting processing (FIG. 9) is executed in step S704, and the flow returns to step S703; otherwise, the flow advances to step S705. It is checked in step S705 if an anti-vibration lens centering command is received. If YES in step S705, anti-vibration lens centering processing (FIG. 10) is executed in step S706, and the flow returns to step S703; otherwise, the flow advances to step S707.

It is checked in step S707 if an anti-vibration adjustment starting command is received. If YES in step S707, anti-vibration control starting processing (FIG. 11) is executed in step S709, and the flow returns to step S703; otherwise, the flow advances to step S708. It is checked in step S708 if an anti-vibration control starting command is received. If YES in step S708, the anti-vibration control starting processing is executed in step S709, and the flow returns to step S703; otherwise, the flow advances to step S710.

It is checked in step S710 if an anti-vibration adjustment ending command is received. If YES in step S710, anti-vibration control timer interruption processing is inhibited to end the anti-vibration control in step S712, and the flow returns to step S703; otherwise, the flow advances to step S711. It is checked in step S711 if an anti-vibration control ending command is received. If YES in step S711, the anti-vibration control timer interruption processing is inhibited to end the anti-vibration control in step S712, and the flow returns to step S703; otherwise, the flow advances to step S713.

It is checked in step S713 if a data reading command is received. If YES in step S713, data designated by the communication tool 15 is transferred to the communication tool 15 in step S714, and the flow returns to step S703; otherwise, the flow advances to step S715. It is checked in step S715 if a data writing command is received. If YES in step S715, data transferred from the communication tool 15 is written in data designated by the communication tool 15 in step S716, and the flow returns to step S703; otherwise, the flow advances to step S717. It is checked in step S717 if an EEPROM writing command is received. If YES in step S717, data transferred from the communication tool 15 is written in data of the EEPROM 10' designated by the communication tool 15 in step S718, and the flow returns to step S703; otherwise, the flow advances to step S719. It is checked in step S719 if a communication mode releasing command is received. If YES in step S719, the communication mode processing of the camera ends in step S720; otherwise, the flow returns to step S703. As described above, the camera executes the processing corresponding to a command supplied from the communication tool 15.

Figure 9:
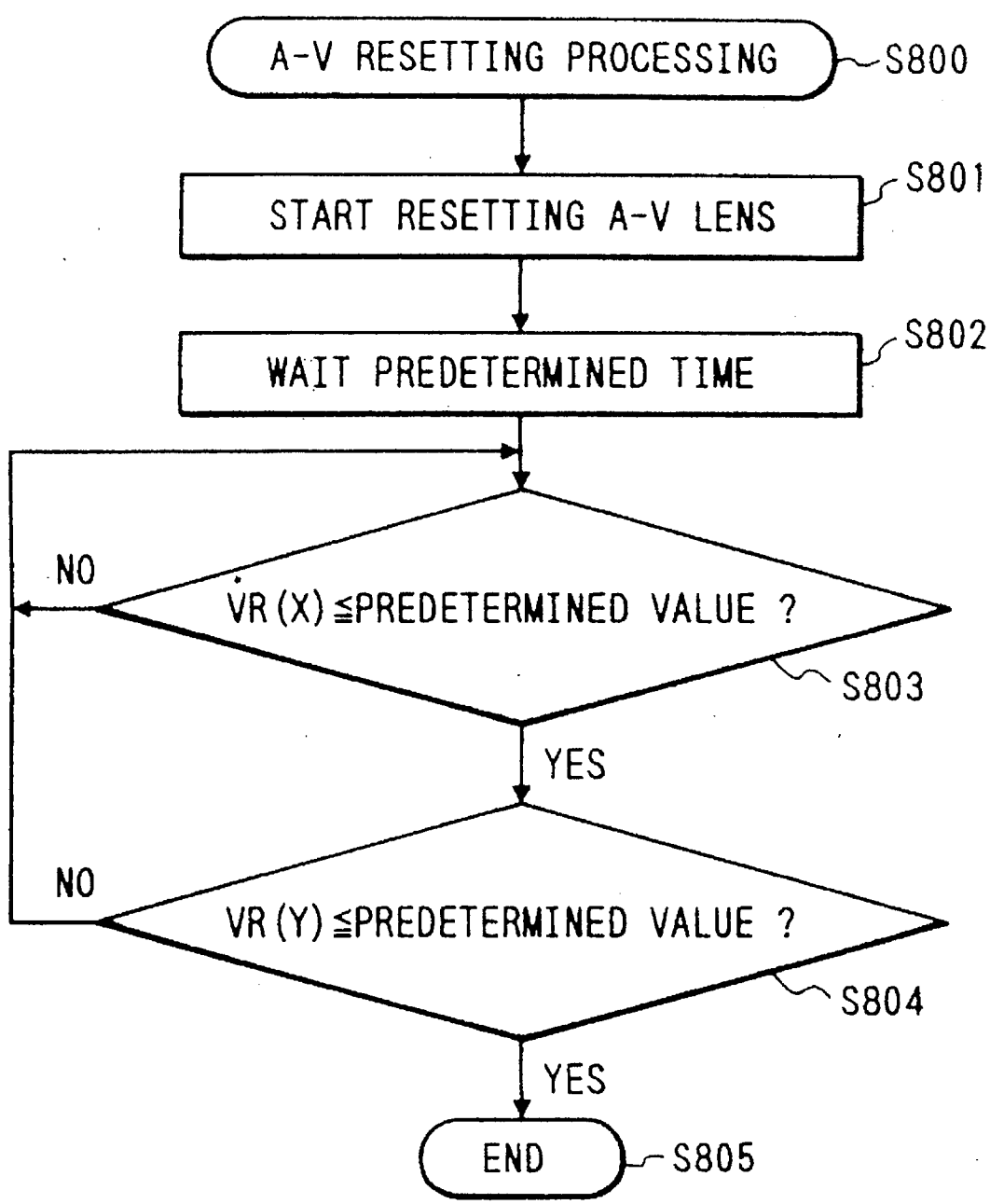
FIG. 9 is a flow chart showing an embodiment of anti-vibration lens resetting processing in step S704 in FIG. 8A.

FIG. 9 is a flow chart showing an embodiment of the anti-vibration lens resetting processing in step S704 in FIG. 8A. The flow advances from step S704 to step S800, and the anti-vibration lens resetting processing is started. In step S801, anti-vibration lens resetting timer interruption processing (FIG. 12) is permitted, and the resetting processing of the anti-vibration lens 13 is started. In step S802, the control waits for a predetermined time (e.g., about 10 ms), and the flow advances to step S803. It is checked in step S803 if an X-axis anti-vibration lens velocity VR(X) is equal to or smaller than a predetermined value, i.e., if the X-axis resetting drive operation of the anti-vibration lens is completed. If YES in step S803, the flow advances to step S804; otherwise, the flow returns to step S803. It is checked in step S804 if a Y-axis anti-vibration lens velocity VR(Y) is equal to or smaller than a predetermined value, i.e., if the Y-axis resetting drive operation of the anti-vibration lens is completed. If YES in step S804, the flow advances to step S805 to end the anti-vibration lens resetting processing; otherwise, the flow returns to step S803.

Therefore, the processing operations in steps S803 and S804 are repeated until both the X- and Y-axis anti-vibration lens resetting processing operations are completed, and when the operations for both the axes are completed, the processing ends in step S805. Whether or not the anti-vibration lens resetting drive operation is completed is determined by utilizing the fact that the velocities VR(X) and VR(Y) of the anti-vibration lens 13 become substantially zero when the anti-vibration lens 13 has reached a resetting end as one end of its control range. The reason why the control waits for the predetermined time in step S802 is to avoid discrimination errors in the processing operations in steps S803 and S804 since the velocities VR(X) and VR(Y) of the anti-vibration lens 13 rise from substantially zero in an early stage of the resetting drive operation of the anti-vibration lens 13.

Figure 12:
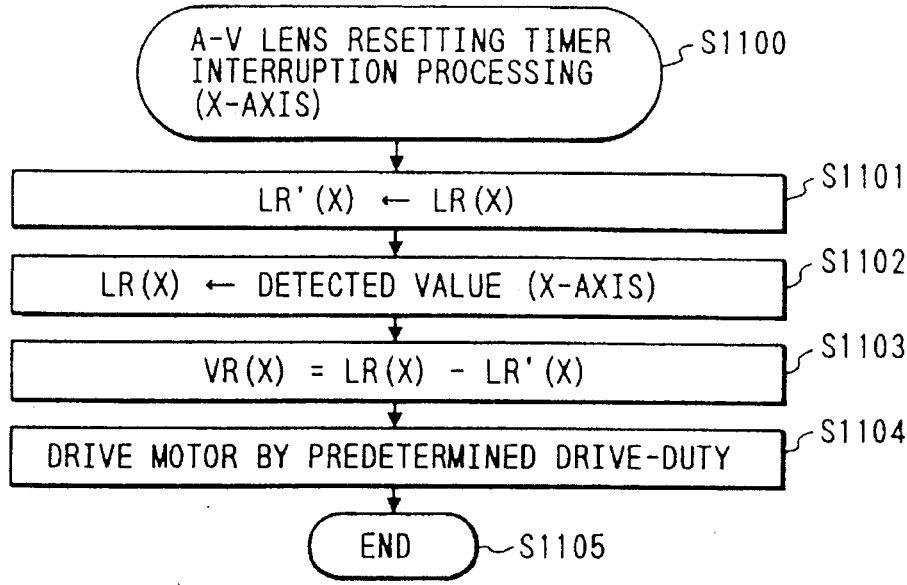
FIG. 12 is a flow chart showing an embodiment of anti-vibration lens resetting timer interruption processing.

FIG. 12 is a flow chart showing an embodiment of the anti-vibration lens resetting timer interruption processing in step S801 in FIG. 9. In practice, two anti-vibration lens resetting timer interruption processing operations for the X- and Y-axes are performed. However, since these processing operations are the same, only the processing for the X-axis side will be explained below, and a description of the processing for the Y-axis side will be omitted.

This processing is repetitively executed at a predetermined interval (e.g., a 1-ms interval). When this anti-vibration lens resetting timer interruption processing is permitted in step S801, an anti-vibration lens position LR(X) which was set in the previous anti-vibration lens resetting timer interruption processing is set in LR' (X) in step S1101. Then, the X-axis position of the anti-vibration lens 13 detected by the circuit 6 for detecting the lens position on the X-axis is set in LR(X) in step S1102. In step S1103, LR' (X) is subtracted from LR(X) to calculate a change in position of the anti-vibration lens 13 during a predetermined period of time, i.e., the velocity VR(X) of the anti-vibration lens 13 in the X-axis direction. In step S1104, the motor 4 is driven at a predetermined drive-duty to move the anti-vibration lens 13 to the resetting position in the X-axis direction. In step S1105, this anti-vibration lens resetting timer interruption processing ends.

Figure 10:
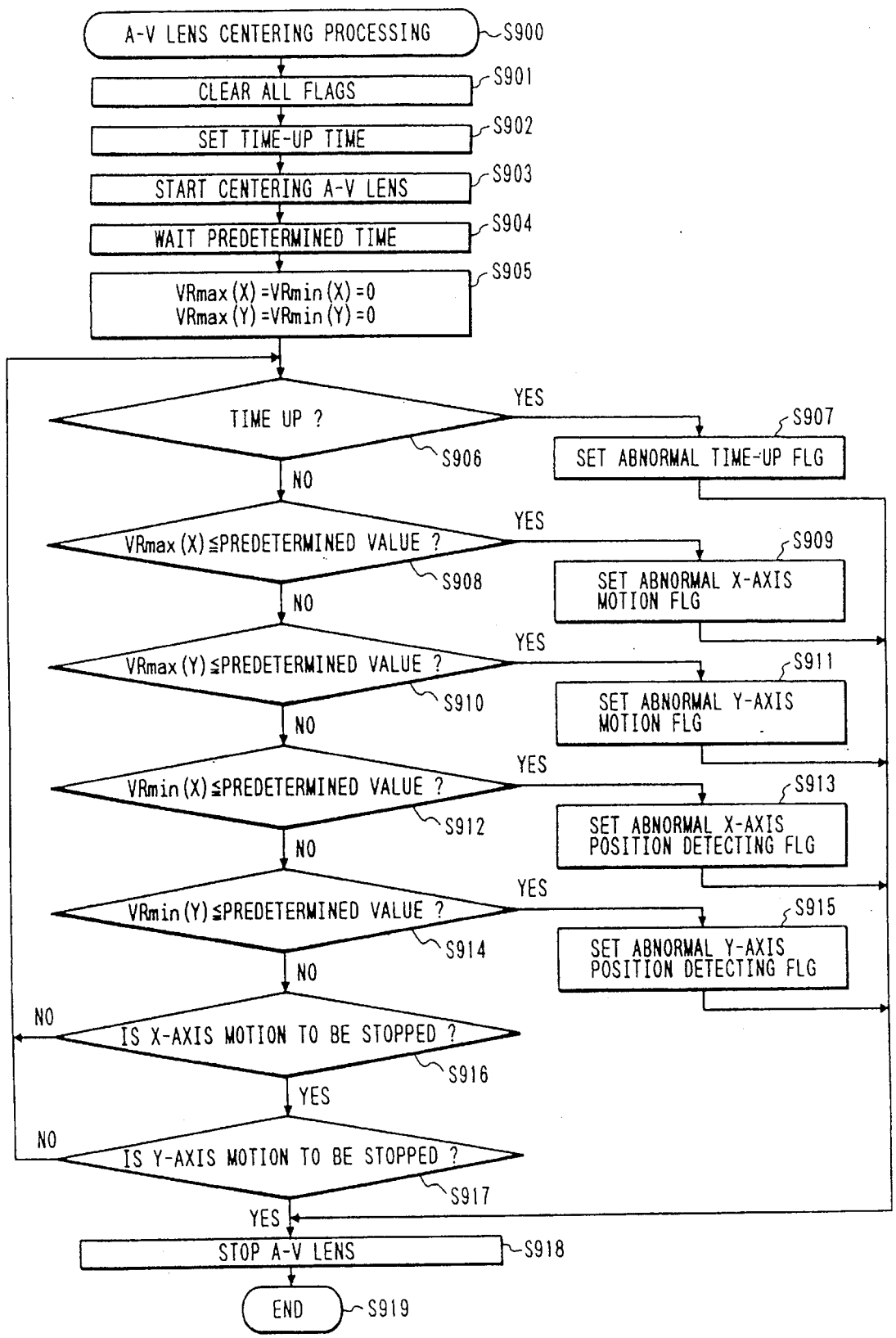
FIG. 10 is a flow chart showing an embodiment of an anti-vibration lens centering processing in step S706 in FIG. 8A.

FIG. 10 is a flow chart showing an embodiment of the anti-vibration lens centering processing in step S706 in FIG. 8A. In this anti-vibration lens centering processing, the anti-vibration lens 13 is driven to a central position LS. When the flow advances from step S706 to step S900 to start processing, an anti-vibration stop flag, and flags set upon detection of abnormalities (an abnormal anti-vibration lens centering time-up flag, abnormal X- and Y-axis anti-vibration lens motion flags, and abnormal X- and Y-axis anti-vibration lens position detecting flags) are cleared in step S901. In step S902, an anti-vibration lens centering processing interruption time-up time is set. This setting time defines a time period in which the anti-vibration lens 13 can be reliably driven to the central position from the beginning of the centering control unless some abnormality occurs.

In step S903, anti-vibration lens centering timer interruption processing (FIG. 13) is permitted, and anti-vibration lens centering control is started. In step S904, the control waits for a predetermined time. In step S905, maximum values VRmax(X) and VRmax(Y) and minimum values VRmin(X) and VRmin(Y) of the X- and Y-axis velocities of the anti-vibration lens 13 are cleared.

The meaning of waiting for the predetermined time in step S904 will be explained below. As the circuits 6 and 7 for detecting the lens positions on the X- and Y-axes, an arrangement for detecting a change in position of the anti-vibration lens 13 based on the number of counts of interrupter signal pulses is normally used. In the above-mentioned detecting method, since interrupter signals are discrete signals, the anti-vibration lens velocity VR is often detected based on the number of pulses input during a predetermined period of time or the reciprocal of the period of the interrupter signals.

However, in an early stage of the centering control of the anti-vibration lens 13, the anti-vibration lens velocity value may not often be precisely detected, or an impossibly large value may be detected. Thus, even when an interrupter is used, the control waits for the predetermined time from the beginning of the centering control, and after precise anti-vibration lens velocities are calculated, VRmax(X), VRmax(Y), VRmin(X), and VRmin(Y) are cleared.

Figure 13:
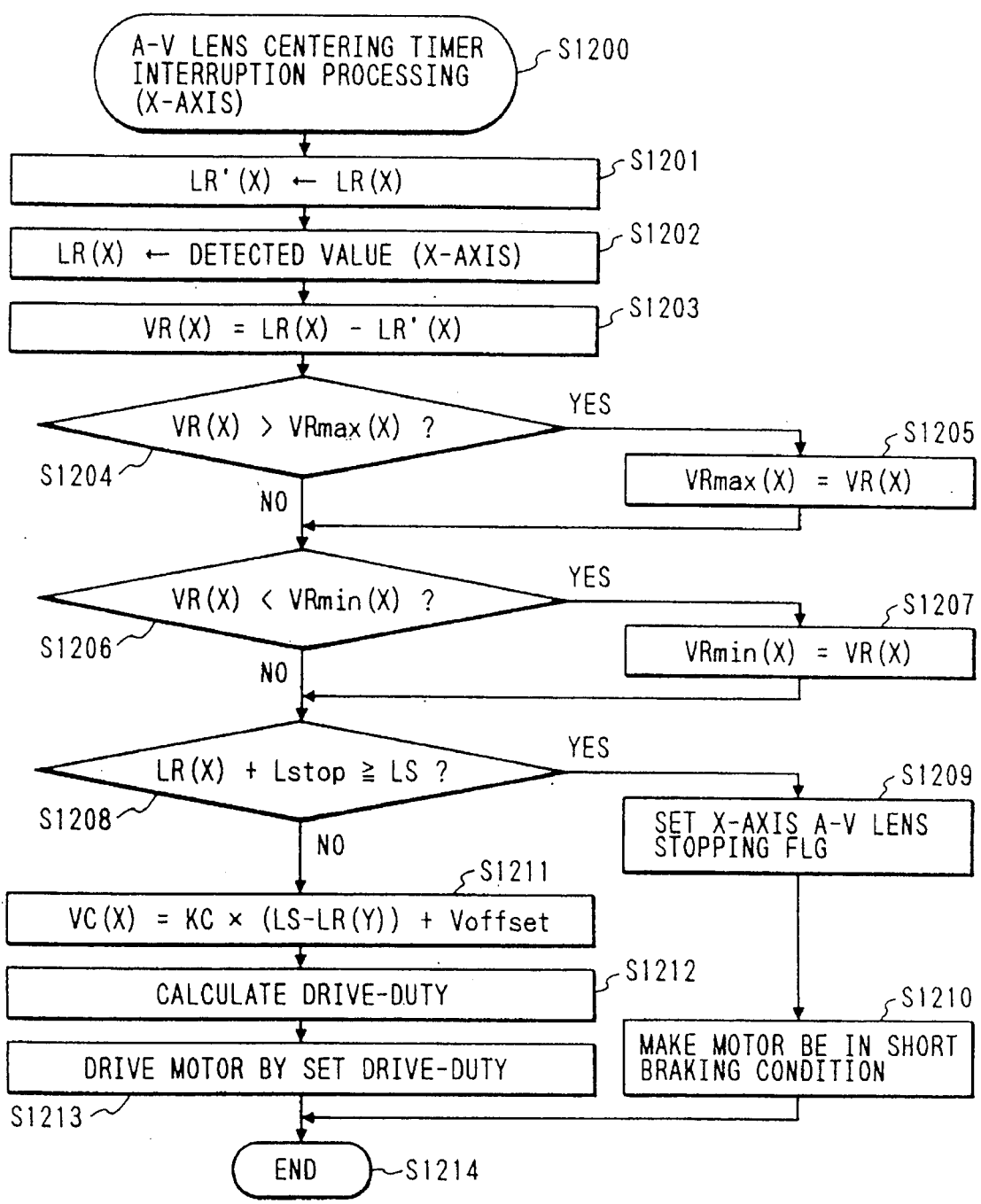
FIG. 13 is a flow chart showing an embodiment of anti-vibration lens centering timer interruption processing.

Note that the wait time in step S904 is normally set to fall within a range from 5 ms to ten-odd ms. In addition, VRmax(X), VRmax(Y), VRmin(X), and VRmin(Y) are detected in anti-vibration lens centering timer interruption processing (FIG. 13).

It is checked in step S906 if the anti-vibration lens centering processing interruption timer set in step S902 has reached a time-up state, i.e., if a predetermined period of time has elapsed from the beginning of the centering control of the anti-vibration lens 13. If YES in step S906, an abnormal time-up state is determined, and the flow advances to step 907 to set an abnormal anti-vibration lens centering time-up flag. Thereafter, the flow advances to step S918. On the other hand, if NO in step S906, the flow advances to step S908 to check if VRmax(X) is equal to or smaller than a predetermined value. If YES in step S908, it is determined that a motion, in the X-axis direction, of the anti-vibration lens 13 is abnormal, and the flow advances to step S909 to set an abnormal X-axis anti-vibration lens motion flag. Thereafter, the flow advances to step S918. On the other hand, if NO in step S908, the flow advances to step S910.

It is checked in step S910 if VRmax(Y) is equal to or smaller than a predetermined value. If YES in step S910, it is determined that a motion, in the Y-axis direction, of the anti-vibration lens 13 is abnormal, and the flow advances to step S911 to set an abnormal Y-axis anti-vibration lens motion flag. Thereafter, the flow advances to step S918. On the other hand, if NO in step S910, the flow advances to step S912. In the processing operations in steps S908 and S910, abnormal motions of the anti-vibration lens 13 are discriminated by utilizing the fact that the maximum values VRmax(X) and VRmax(Y) assume small values when the motion of the anti-vibration lens 13 is not smooth. Alternatively, VRmax(X) and VRmax(Y) may be discriminated by checking if the anti-vibration lens velocities VR(X) and VR(Y) are equal to or smaller than predetermined values.

It is then checked in step S912 if VRmin(X) is equal to or smaller than a predetermined value. If YES in step S912, it is determined that the detected X-axis lens position is abnormal, and the flow advances to step S913 to set an abnormal X-axis anti-vibration lens position detecting flag. Thereafter, the flow advances to step S918. On the other hand, if NO in step S912, the flow advances to step S914.

It is checked in step S914 if VRmin(Y) is equal to or smaller than a predetermined value. If YES in step S914, it is determined that the detected Y-axis lens position is abnormal, and the flow advances to step S915 to set an abnormal Y-axis anti-vibration lens position detecting flag. Thereafter, the flow advances to step S918. On the other hand, if NO in step S914, the flow advances to step S916.

In the processing operations in steps S912 and S914, abnormalities of the circuits 6 and 7 for detecting the lens positions on the X- and Y-axes are discriminated by utilizing the fact that abnormal values which are detected in the anti-vibration lens centering timer interruption processing (FIG. 13) are set in VRmin(X) and VRmin(Y) when the anti-vibration lens velocities VR(X) and VR(Y) based on the outputs from circuits 6 and 7 for detecting the lens positions on the X- and Y-axes are abnormal values and are calculated as impossibly small values (e.g., values with a negative sign). Alternatively, VRmin(X) and VRmin(Y) may be discriminated by checking whether or not the anti-vibration lens velocities VR(X) and VR(Y) are equal to or smaller than predetermined values.

It is then checked in step S916 if the operation of the anti-vibration lens 13 in the X-axis direction is to be stopped. If YES in step S916, the flow advances to step S917; otherwise, the flow returns to step S906. In this case, whether or not the anti-vibration lens 13 is to be stopped is determined based on the X-axis anti-vibration lens stop flag. The X-axis anti-vibration lens stop flag is set when the X-axis anti-vibration lens position LR(X) set in the anti-vibration centering timer interruption processing has reached a position a predetermined value Lstop before the central position LS.

It is checked in step S917 if the operation of the anti-vibration lens 13 in the Y-axis direction is to be stopped, as in step S916. If YES in step S917, the flow advances to step S918; otherwise, the flow returns to step S906. In this case, whether or not the anti-vibration lens 13 is to be stopped is determined based on the Y-axis anti-vibration lens stop flag in the same manner as in the above description. The Y-axis anti-vibration lens stop flag is set when the Y-axis anti-vibration lens position LR(Y) set in the anti-vibration centering timer interruption processing has reached a position the predetermined value Lstop before the central position LS.

With the processing operations in steps S916 and S917, the processing operations in steps S906 to S917 are repetitively executed until the X- and Y-axis positions of the anti-vibration lens 13 have reached positions the predetermined value Lstop before the central position LS. When both the X- and Y-axis positions have reached predetermined values, the flow advances to step S918.

In step S918, the centering timer interruption processing of the anti-vibration lens 13 is inhibited. With this processing, the motors 4 and 5 are set in a short-brake state to stop the anti-vibration lens 13 in both the two axis directions. The flow then advances to step S919 to end the anti-vibration lens centering processing.

FIG. 13 is a flow chart showing an embodiment of the anti-vibration lens centering timer interruption processing in step S903 in FIG. 10. In practice, two anti-vibration lens centering timer interruption processing operations for the X- and Y-axes are performed. However, since these processing operations are the same, only the processing for the X-axis side will be explained below, and a description of the processing for the Y-axis side will be omitted.

This processing is repetitively executed at a predetermined interval (e.g., a 1-ms interval) when the anti-vibration lens centering timer interruption processing is permitted in step S903. In step S1201, the anti-vibration lens position LR(X) which was set in the previous anti-vibration lens centering timer interruption processing is set in LR'(X). Furthermore, in step S1202, the X-axis position of the anti-vibration lens 13 detected by the circuit 6 for detecting the lens positions on the X-axis is set in LR(X). In step S1203, LR'(X) is subtracted from LR(X) to calculate a change in position of the anti-vibration lens 13 during a predetermined period of time, i.e., the velocity VR(X) of the anti-vibration lens 13 in the X-axis direction.

It is checked in step S1204 if the anti-vibration lens velocity VR(X) in the X-axis direction is larger than VRmax(X). If YES in step S1204, the flow advances to step S1205 to set VR(X) in VRmax(X), and the flow advances to step S1206. On the other hand, if NO in step S1204, the flow advances to step S1206. It is checked in step S1206 if the anti-vibration lens velocity VR(X) in the X-axis direction is smaller than VRmin(Y). If YES in step S1206, the flow advances to step S1207 to set VR(X) in VRmin(X), and the flow advances to step S1208. On the other hand, if NO in step S1206, the flow advances to step S1208. With the processing in steps S1204 to S1207, the maximum value VRmax(X) and minimum value VRmin(X) of the anti-vibration lens velocity VR(X) in the X-axis direction are detected.

In step S1208, whether or not the anti-vibration lens position LR(X) in the X-axis direction has been driven to a position the predetermined amount Lstop before the central position LS is determined by checking if LR(X)+Lstop is equal to or larger than LS. If YES in step S1208, the flow advances to step S1209 to set the X-axis anti-vibration lens stop flag. In step S1210, the motor 4 is set in a short-brake state. Thereafter, the flow advances to step S1214 to end the anti-vibration lens centering timer interruption processing. On the other hand, if NO in step S1208, the flow advances to step S1211.

A target velocity VC(X) of the anti-vibration lens in the X-axis direction is calculated by the following equation (47) in step. S1211, and a drive-duty is calculated by the following equation (48) in step S1212:

$$VC(X)=K10\times\{LS-LR(X)\}+Voffset \qquad (47)$$

$$\text{Centering drive-duty}=K1\times VC(X)+K2\times\{VC(X)-VR(X)\}\pm Doffset \quad (48)$$

In equation (47), a sum of a predetermined velocity Voffset and a velocity corresponding to a difference between the anti-vibration lens position LR(X) in the X-axis direction detected by the circuit 6 for detecting the lens positions on the X-axis and the central position LS is set to be the anti-vibration lens target velocity VC(X) in the X-axis direction. On the other hand, the motor 4 is driven at a drive-duty calculated by equation (48) before the anti-vibration lens position LR(X) in the X-axis direction reaches a position the predetermined value Lstop before the central position LS, and thereafter, the motor 4 is set in a short-brake state.

In equation (48) a duty obtained by multiplying the anti-vibration lens target velocity VC(X) in the X-axis direction with a predetermined coefficient K1 is added to a duty obtained by multiplying the anti-vibration lens velocity VR(X) in the X-axis direction with a predetermined coefficient K2, and when the sum is positive, Doffset is added to the sum; when the sum is negative, Doffset is subtracted from the sum, thereby calculating the drive-duty.

With these calculations, the anti-vibration lens 13 is subjected to velocity control substantially at the anti-vibration lens target velocity VC(X) set in the X-axis direction.

In step S1213, the motor 4 is driven at the calculated drive-duty to move the anti-vibration lens 13 in the direction of the central position LS along the X-axis. Thereafter, the flow advances to step S1214 to end this processing.

Figure 6:
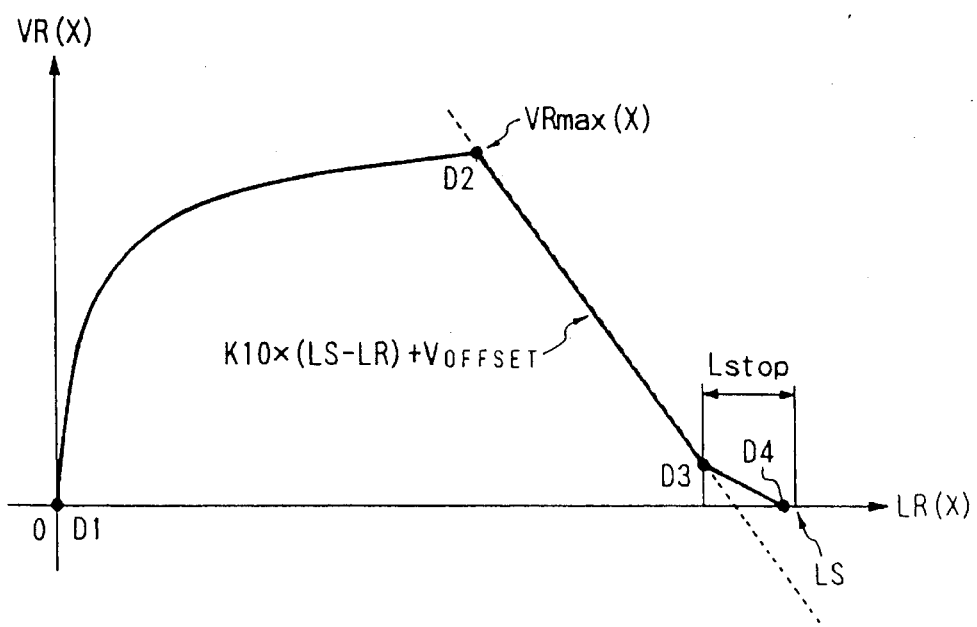
FIG. 6 is a graph for explaining the centering control state of an anti-vibration lens 13 in the X-axis direction.

The above-mentioned centering control state of the anti-vibration lens 13 will be explained below. FIG. 6 is a graph for explaining the centering control state, in the X-axis direction, of the anti-vibration lens 13.

Referring to FIG. 6, the centering drive operation of the anti-vibration lens 13 is started from D1 to control the velocity of the anti-vibration lens 13 to be the set target velocity VC(X) of the anti-vibration lens. The anti-vibration lens velocity VR(X) in the X-axis direction gradually increases in association with the time constant of an anti-vibration control system including the motor 4, the anti-vibration lens shift mechanism system, and the like, and reaches a maximum value at D2. Between D2 and D3 as a position the amount Lstop before the central position LS, VC(X) is set based on a straight line calculated by equation (47). The velocity of the anti-vibration lens 13 is controlled along this straight line. As the lens position approaches the central position LS, the anti-vibration lens velocity VR(X) gradually decreases, and the motor 4 is set in a short-brake state from D3. Finally, the anti-vibration lens 13 stops at D4 near the central position LS.

When the anti-vibration lens centering processing is executed in this manner, the anti-vibration lens 13 is driven to a position near the target central position LS. In addition, the maximum value of the anti-vibration lens velocity in the X-axis direction during this drive operation is detected and is stored in VRmax(X). The maximum velocity VRmax(X) changes depending on the smoothness of the anti-vibration lens shift mechanism system. When a failure occurs in the mechanism for some cause, the maximum velocity VRmax(X) assumes a small value, and at the same time, the abnormal X-axis anti-vibration lens motion flag is set. When an abnormality occurs in the circuit 6 for detecting the lens position on the X-axis, and an anti-vibration lens velocity VR' (X) that cannot be is calculated during the centering control and assumes, e.g., a negative value, this value is stored in VRmin(X), and the abnormal X-axis anti-vibration lens position detecting flag is set.

Note that the Y-axis anti-vibration lens centering timer interruption processing is performed in the same manner as the above-mentioned processing in the X-axis direction. More specifically, the maximum value of the anti-vibration lens velocity in the Y-axis direction at that time is stored in VRmax(Y), and when abnormalities are detected, corresponding abnormal flags (abnormal Y-axis anti-vibration lens motion flag and abnormal Y-axis anti-vibration lens position detecting flag) are set. When the positions in the two axis directions cannot reach the central position LS after the control has been continued for a predetermined period of time, an abnormal anti-vibration lens time-up flag is set.

Figure 11:
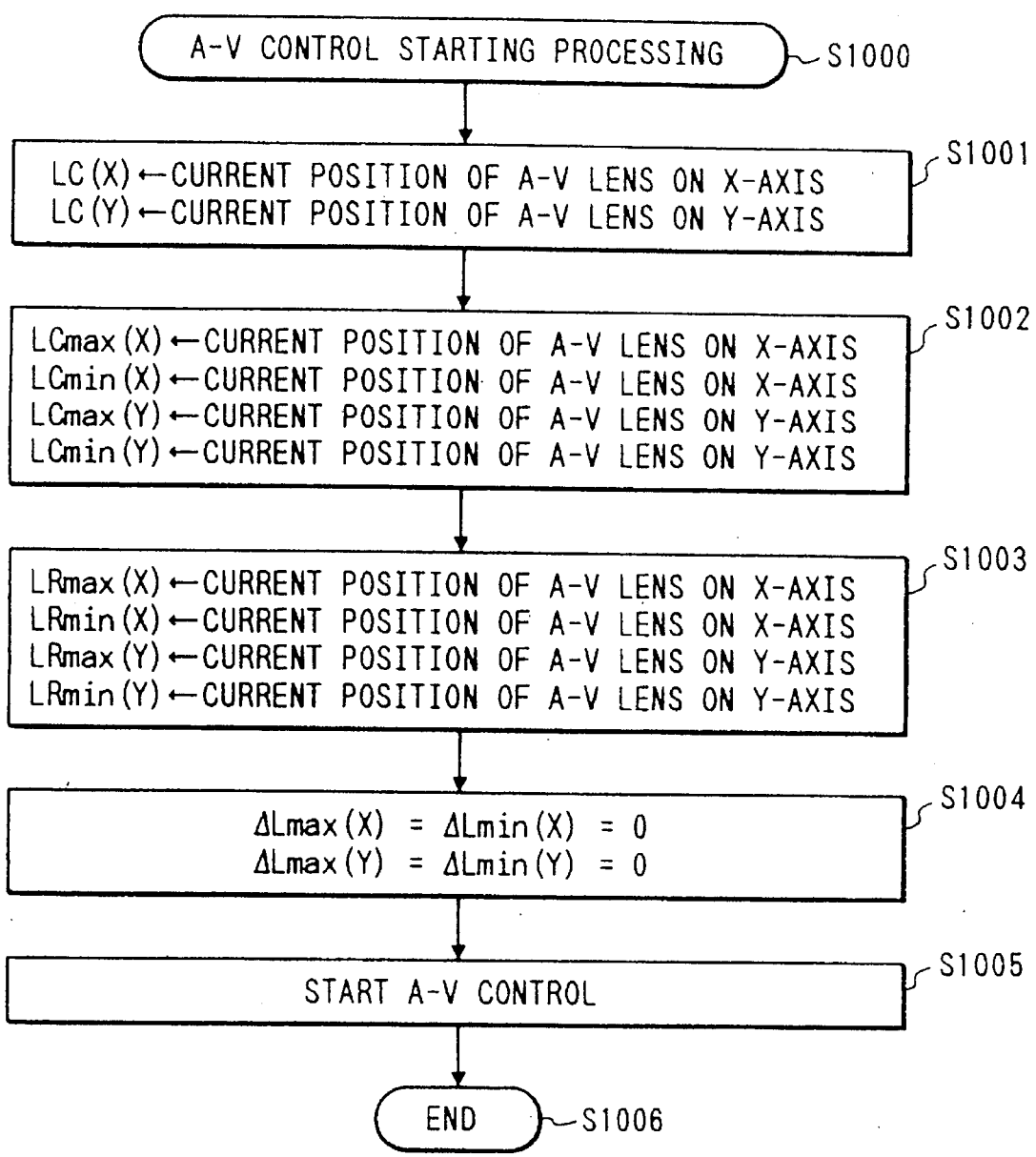
FIG. 11 is a flow chart showing an embodiment of anti-vibration control starting processing in step S709 in FIG. 8A.

FIG. 11 is a flow chart showing an embodiment of the anti-vibration control starting processing in step S709 in FIG. 8A. This processing starts anti-vibration control processing for suppressing an image blur on the imaging plane by detecting the maximum and minimum values of the X- and Y-axis anti-vibration lens target positions, the maximum and minimum values of the anti-vibration lens positions, a control error, and the like, and moving the anti-vibration lens 13 in the respective directions in correspondence with the outputs from the yaw and pitch angular velocity detecting circuits 8 and 9.

When the flow advances from step S709 to step S1000 to start this processing, the current lens positions are detected based on the outputs from the circuits 6 and 7 for detecting the lens positions on the X- and Y-axes, and are respectively set in X- and Y-axis anti-vibration lens target positions LC(X) and LC(Y) in step S1001. In step S1002, the current anti-vibration lens positions detected based on the outputs from the circuits 6 and 7 for detecting the lens positions on the X- and Y-axes are respectively set in maximum and minimum values LCmax(X), LCmax(Y), LCmin(X), and LCmin(Y) of X- and Y-axis anti-vibration lens target positions.

In step S1003, the current anti-vibration lens positions detected based on the outputs from the circuits 6 and 7 for detecting the lens positions on the X- and Y-axes are respectively set in maximum and minimum values LRmax(X), LRmax(Y), LRmin(X), and LRmin(Y) of X- and Y-axis anti-vibration lens positions. In step S1004, maximum and minimum values ΔLmax(X), ΔLmax(Y), ΔLmin(X), and ΔLmin(Y) of X- and Y-axis anti-vibration lens position errors are cleared. In step S1005, anti-vibration control timer interruption processing (FIG. 14) is permitted to start the anti-vibration control. In step S1006, this anti-vibration control starting processing ends.

Figure 14:
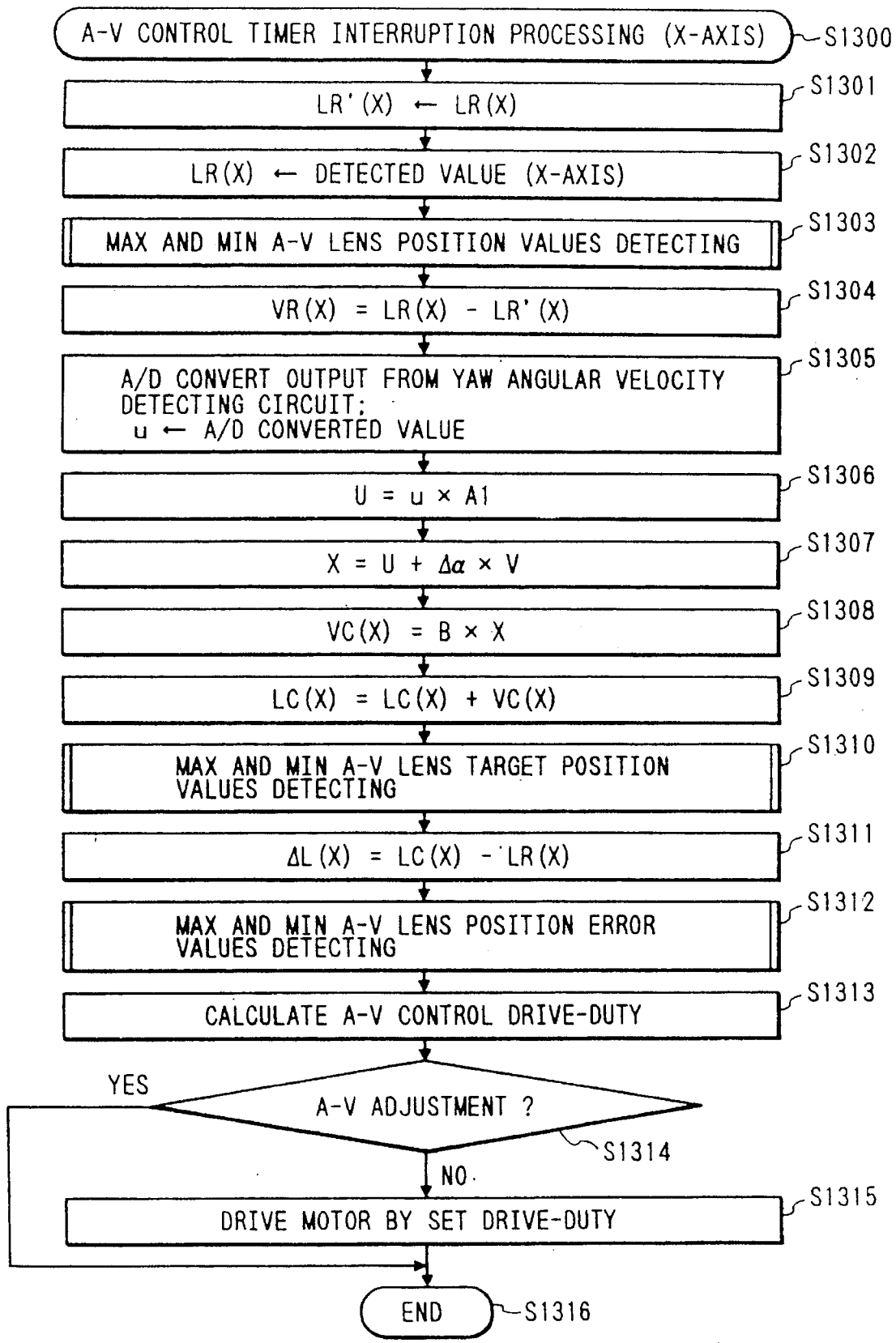
FIG. 14 is a flow chart showing an embodiment of anti-vibration control timer interruption processing.

FIG. 14 is a flow chart showing an embodiment of the anti-vibration control timer interruption processing which is executed at a predetermined time interval when the anti-vibration control timer interruption processing is permitted in the anti-vibration control starting processing in step S1005 in FIG. 11. The processing is started from step S1300. In practice, two anti-vibration control timer interruption processing operations for the X- and Y-axes are performed. However, since these processing operations are the same, only the processing for the X-axis side will be explained below, and a description of the processing for the Y-axis side will be omitted. This processing is repetitively executed at a predetermined interval (e.g., a 1-ms interval). In step S1301, the anti-vibration lens position LR(X) which was set in the previous anti-vibration control timer interruption processing is set in LR' (X). In step S1302, the X-axis position of the anti-vibration lens 13 detected by the circuit 6 for detecting the lens position on the X-axis is set in LR(X).

Figure 15:
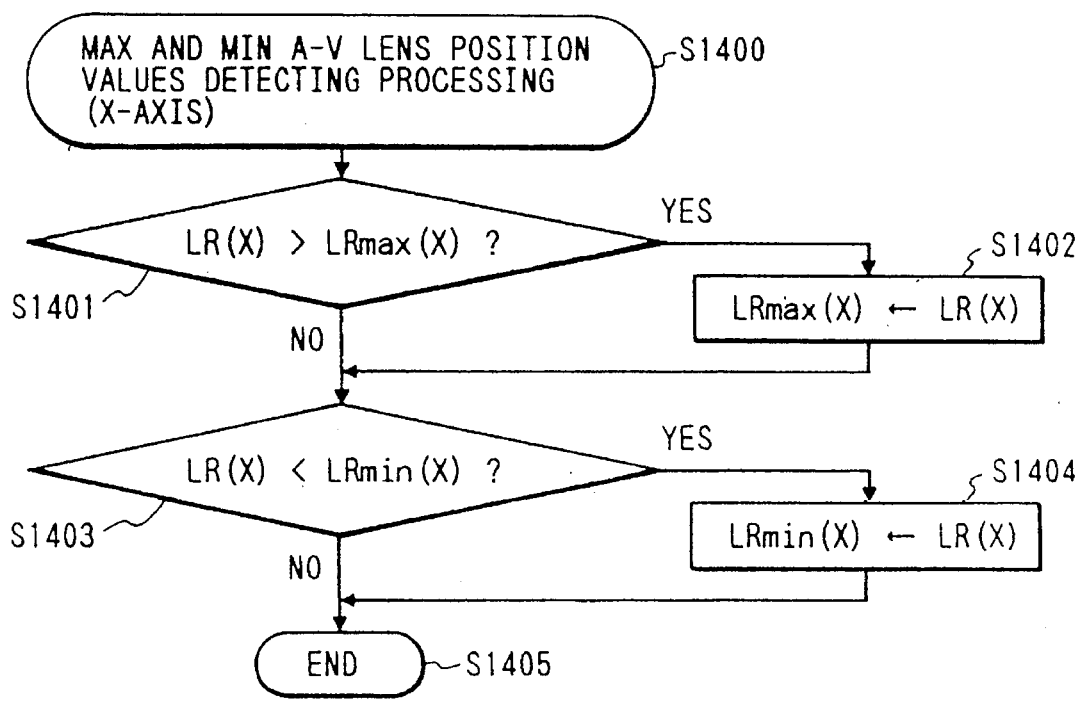
FIG. 15 is a flow chart showing an embodiment of detecting processing of max and min anti-vibration lens position values.

In step S1303, detecting processing of max and min anti-vibration lens position values is executed. FIG. 15 is a flow chart showing an embodiment of the detecting processing of max and min anti-vibration lens position values. The flow advances from step S1303 to step S1400 in FIG. 15. It is checked in step S1401 if the X-axis anti-vibration lens position LR(X) is larger than LRmax(X). If YES in step S1401, the flow advances to step S1402 to set LR(X) in LRmax(X), and the flow advances to step S1403. On the other hand, if NO in step S1401, the flow advances to step S1403.

It is checked in step S1403 if the X-axis anti-vibration lens position LR(X) is smaller than LRmin(X). If YES in step S1403, the flow advances to step S1404 to set LR(X) in LRmin(X), and the flow then advances to step S1405. On the other hand, if NO in step S1403, the flow advances to step S1405. The processing ends in step S1405. With the above-mentioned processing, the maximum and minimum values of the anti-vibration lens position LR(X) are respectively detected in LRmax(X) and LRmin(X).

The flow advances from step S1405 to step S1304 in FIG. 14. In step S1304, LR' (X) is subtracted from LR(X) to calculate a change in position of the anti-vibration lens 13 in the X-axis direction during a predetermined period of time, i.e., the velocity VR(X) of the anti-vibration lens 13 in the X-axis direction. In step S1305, the output from the yaw angular velocity detecting circuit 8 is A/D-converted, and the A/D-converted value is set in u. In step S1306, u is multiplied with the gain adjustment value A1, and the product is set in U, thereby calculating the gain-adjusted angular velocity in the yaw direction. In step S1307, the other gain-adjusted angular velocity value V is multiplied with the angular deviation adjustment value $\Delta\alpha$ (=$\sin\alpha$), as shown in equation (23), and the product is added to U, thus calculating an output X, the angular deviation of which is corrected.

Note that V is the gain-adjusted angular velocity value which is calculated in the anti-vibration control timer interruption processing for the Y-axis as the other axis. Strictly speaking, since it is impossible to simultaneously execute this anti-vibration control timer interrupt processing for the X- and Y-axes, the sampling timings for A/D-converting the outputs from the yaw and pitch angular velocity detecting circuits 8 and 9 are different. However, the amount of V which changes during this timing difference is very small and negligible.

In step S1308, X calculated in step S1307 is multiplied with the angular velocity-anti-vibration lens target velocity conversion coefficient B to calculate the X-axis anti-vibration lens target velocity VC(X). In step S1309, the X-axis anti-vibration lens target position LC(X) is added to VC(X) to set LC(X). By accumulating VC(X) at a predetermined interval, the anti-vibration lens target position LC(X) can be calculated. Since LC(X) is set at the timing of step S1001 in FIG. 11, the anti-vibration lens target position LC(X) is kept calculated by accumulating the anti-vibration lens target velocity LC(X) as long as the anti-vibration control timer interrupt processing is permitted to have the timing as an initial value.

Figure 16:
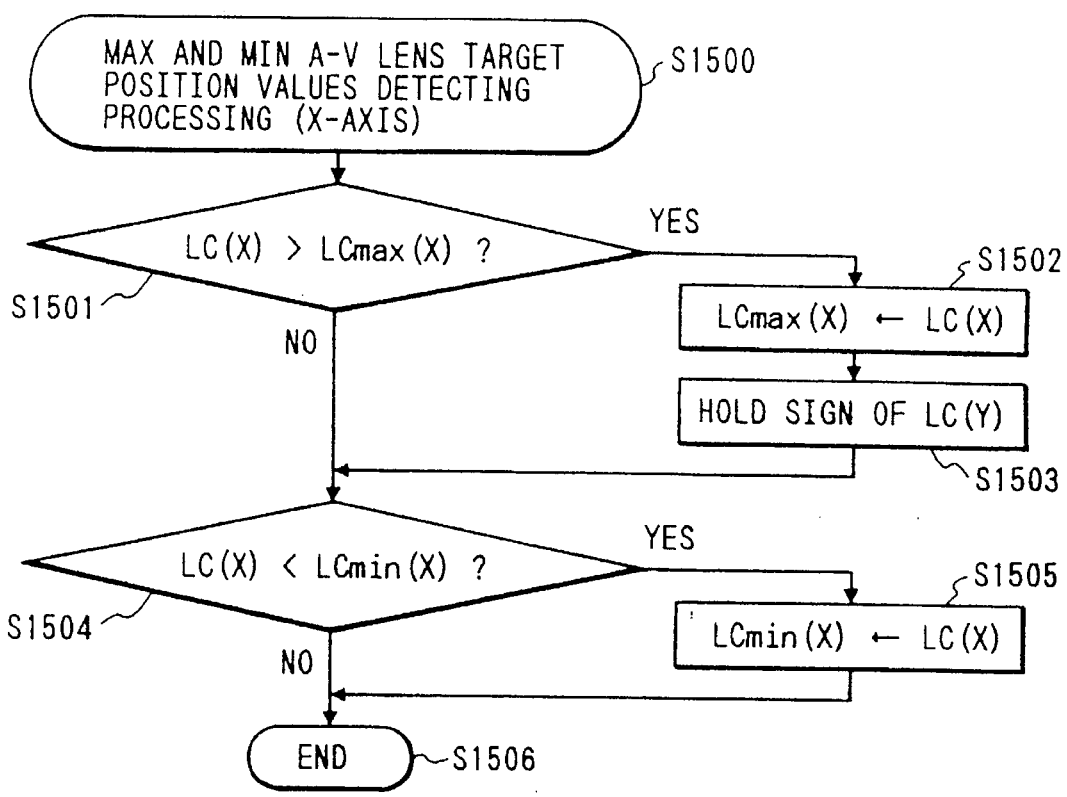
FIG. 16 is a flow chart showing an embodiment of detecting processing of max and min anti-vibration lens target position values.

In step S1310, detecting processing of max and min anti-vibration lens target position values is executed. FIG. 16 is a flow chart showing an embodiment of the detecting processing of max and min anti-vibration lens target position values. The flow advances from step S1310 to step S1500 in FIG. 16. It is checked in step S1501 if the X-axis anti-vibration lens target position LC(X) is larger than LCmax(X). If YES in step S1501, the flow advances to step S1502 to set LC(X) in LCmax(X). In step S1503, the sign of the anti-vibration lens target velocity LC(Y) of the Y-axis as the other axis is held, and the flow advances to step S1504. On the other hand, if NO in step S1501, the flow advances to step S1504.

It is checked in step S1504 if the X-axis anti-vibration lens target position LC(X) is smaller than LCmin(X). If YES in step S1504, the flow advances to step S1505 to set LC(X) in LCmin(X), and the flow then advances to step S1506. However, if NO in step S1504, the flow advances to step S1506. This processing ends in step S1506. With this processing, the maximum and minimum values of the anti-vibration lens target position LC(X) in the X-axis direction are respectively detected in LCmax(X) and LCmin(X), and the sign of the anti-vibration lens target position LC(Y) of the other axis upon detection of the maximum value is obtained.

Figure 17:
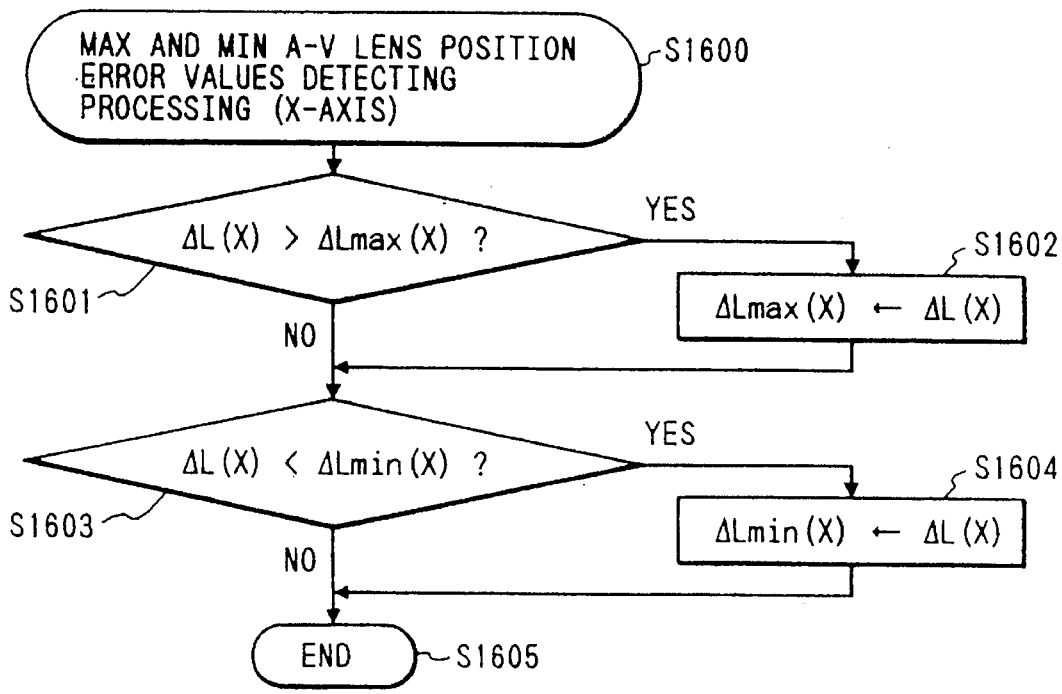
FIG. 17 is a flow chart showing an embodiment of detecting processing of max and min anti-vibration lens position error values.

The flow advances from step S1506 to step S1311 in FIG. 14. In step S1311, the anti-vibration lens position LR(X) is subtracted from the X-axis anti-vibration lens target position LC(X) to calculate an anti-vibration lens position error $\Delta L(X)$. The flow advances to step S1312 to execute detecting processing of max and min anti-vibration lens position error values. FIG. 17 is a flow chart showing an embodiment of the detecting processing of max and min anti-vibration lens position error values. The flow advances from step S1312 to step S1600 in FIG. 17. In step S1601, it is checked if the X-axis anti-vibration lens position error $\Delta L(X)$ is larger than $\Delta Lmax(X)$. If YES in step S1601, the flow advances to step S1602 to set $\Delta L(X)$ in $\Delta Lmax(X)$, and thereafter, the flow advances to step S1603. On the other hand, if NO in step S1601, the flow advances to step S1603. It is checked in step S1603 if the X-axis anti-vibration lens position error $\Delta L(X)$ is smaller than $\Delta Lmin(X)$. If YES in step S1603, $\Delta L(X)$ is set in $\Delta Lmin(X)$ in step S1604, and the flow then advances to step S1605. On the other hand, if NO in step S1603, the flow advances to step S1605. This processing ends in step S1605. With this processing, the maximum and minimum value of the anti-vibration lens position error $\Delta L(X)$ in the X-axis direction are respectively detected in $\Delta Lmax(X)$ and $\Delta Lmin(X)$.

The flow advances from step S1605 to step S1313 in FIG. 14. In step S1313, a drive-duty for driving the motor 4 in the anti-vibration control is calculated. In this case, the drive-duty is calculated by, e.g., equation (48) used in the above-mentioned centering control. It is checked in step S1314 if anti-vibration adjustment is to be performed. If NO in step S1314, the flow advances to step S1315, and the motor 4 is driven at the drive-duty calculated in step S1313. However, if YES in step S1314, the flow advances to step S1316 (without driving the motor 42), and this anti-control timer interruption processing ends.

(2) Processing at communication tool side

The defect checking operation of the anti-vibration lens shift mechanism system, gain adjustment and detection angular deviation adjustment of the yaw and pitch angular velocity detecting circuits 8 and 9, and a systematic checking operation of anti-vibration controllability executed at the communication tool side will be described below with reference to FIGS. 7A to 7C.

When this processing is started in step S601, the camera is set in a communication mode by a known method in step S601. With this setting, the camera communication mode processing shown in FIGS. 8A and 8B and executed by the CPU 1 is started. In the processing operations in steps S602 to S607, the defect checking operation of the anti-vibration shift mechanism system is performed. In step S602, an anti-vibration lens resetting command is transmitted to the CPU 1. In response to this command, the CPU 1 of the camera drives the anti-vibration lens 13 to a predetermined reset position in step S704 in FIG. 8A. In step S603, an anti-vibration lens centering command is transmitted, and the anti-vibration lens 13 is driven to the central position LS. In step S604, using the data reading command, the maximum values VRmax(X) and VRmax(Y) of the X- and Y-axis anti-vibration lens velocities and abnormal centering data (the abnormal anti-vibration lens centering time-up flag, the abnormal X- and Y-axis anti-vibration lens motion flags, and the abnormal X- and Y-axis anti-vibration lens position detecting flags) detected during the anti-vibration lens centering control in step S603 are read from the CPU 1.

In step S605, it is checked if VRmax(X) is equal to or larger than a predetermined value. If YES in step S605, the flow advances to step S606; otherwise, the flow advances to step S646 (FIG. 7C) to determine a defect in the mechanism. Thereafter, the flow advances to step S647. It is checked in step S606 if VRmax(Y) is equal to or larger than a predetermined value. If YES in step S606, the flow advances to step S607; otherwise, the flow advances to step S646 to determine a defect in the mechanism, as in the above description. It is checked in step S607 based on the abnormal centering data if abnormal centering is done. If NO in step S607, i.e., if none of the abnormal flags are set, the flow advances to step S608. If at least one of the abnormal flags is set, the flow advances to step S646 to determine a defect in the mechanism, as in the above description.

With the above-mentioned processing in steps S603 to S607 and in step S646, since the centering of the anti-vibration lens 13 is performed and the maximum values of the anti-vibration lens velocities and abnormalities are detected during centering control, it can be checked that the anti-vibration lens shift mechanism system is defective due to some causes when the motions, in the X- and Y-axis directions, of the anti-vibration lens 13 are not smooth, or when the outputs from the circuits 6 and 7 for detecting the lens positions on the X- and Y-axes are abnormal.

In processing operations in steps S608 to S624, the gain adjustment and detection angular deviation adjustment of the yaw and pitch angular velocity detecting circuits 8 and 9 are performed.

The gain adjustment values A1 and A2 in the CPU 1 at the timing of step S608 have the initial value A0 set in step S700 in FIG. 8A, and the angular deviation adjustment values $\Delta\alpha$ and $\Delta\beta$ have the initial value 0 written in step S702 in FIG. 8A.

In step S608, application of a vibration in the X-axis direction is started. With this vibration, the vibrator 18 is vibrated. The vibration in this case is a sinusoidal vibration having a predetermined angular amplitude in the X-axis direction. In step S609, an anti-vibration adjustment starting command is transmitted to the CPU 1. In response to the command in step S609, the CPU 1 executes the anti-vibration control starting processing in step S709 in FIG. 8A. With this processing, the maximum and minimum values LCmax(X), LCmax(Y), LCmin(X), LCmin(Y) of the anti-vibration lens target positions and the signs of LC(Y) and LC(X) upon detection of LCmax(X) and LCmax(Y) are kept detected in the anti-vibration control timer interruption processing in FIG. 14. Since it is determined in step S1314 in FIG. 14 that the anti-vibration adjustment is to be performed, the motors are not driven, and the anti-vibration lens 13 is not driven.

In step S610, the control waits for a predetermined time. In step S611, an anti-vibration adjustment ending command is transmitted to the CPU 1. In response to this command, the CPU 1 inhibits the anti-vibration control timer interruption processing in step S712 in FIG. 8B, and ends the anti-vibration control. In step S612, the vibration application operation, in the X-axis direction, by the vibrator 18 ends. The wait time in step S610 corresponds to a time in which the maximum and minimum values of the anti-vibration lens target positions can be detected at least once during the time interval from step S609 to step S611.

In step S613, using the data reading command, LCmax(X), LCmax(Y), LCmin(X), LCmin(Y) and the signs of LC(Y) and LC(X) upon detection of LCmax(X) and LCmax(Y) which are detected by the CPU 1 are read from the CPU 1. In step S614, the total amplitudes a and b, and the value c of the X- and Y-axis anti-vibration lens target positions are calculated using equations (37), (38), and (39).

The flow then advances to step S615 in FIG. 7B. In step S615, the vibrator 18 is vibrated. This vibration is a sinusoidal vibration having a predetermined angular amplitude in the Y-axis direction. In step S616, an anti-vibration adjustment starting command is transmitted to the CPU 1. In response to the command in step S616, the CPU 1 executes the anti-vibration control starting processing in step S709 in FIG. 8A. With this processing, the maximum and minimum values LCmax(X), LCmax(Y), LCmin(X), LCmin(Y) of the anti-vibration lens target positions and the signs of LC(Y) and LC(X) upon detection of LCmax(X) and LCmax(Y) are kept detected in the anti-vibration control timer interruption processing in FIG. 14. Since it is determined in step S1314 in FIG. 14 that the anti-vibration adjustment is to be performed, the motors are not driven, and the anti-vibration lens 13 is not driven.

In step S617, the control waits for a predetermined time. In step S618, an anti-vibration adjustment ending command is transmitted to the CPU 1. In response to this command, the CPU 1 inhibits the anti-vibration control timer interruption processing in step S712 in FIG. 8B, and ends the anti-vibration control. In step S619, the vibration application operation, in the Y-axis direction, by the vibrator 18 ends. The wait time in step S617 corresponds to a time in which the maximum and minimum values of the anti-vibration lens target positions can be detected at least once during the time interval from step S616 to step S618.

In step S620, using the data reading command, LCmax(X), LCmax(Y), LCmin(X), LCmin(Y) and the signs of LC(Y) and LC(X) upon detection of LCmax(X) and LCmax(Y) which are detected by the CPU 1 are read from the CPU 1. In step S621, the total amplitudes d and e, and the value f of the X- and Y-axis anti-vibration lens target positions are calculated using equations (40), (41), and (42).

In step S622, the gain adjustment values A1 and A2 of the yaw and pitch angular velocity detecting circuits 8 and 9 are calculated using equations (43) and (44). In step S623, the detection angular deviation adjustment values $\Delta\alpha$ and $\Delta\beta$ of the yaw and pitch angular velocity detecting circuits 8 and 9 are calculated using equations (45) and (46). In step S624, an EEPROM writing command is transmitted, and the gain adjustment values A1 and A2 and the detection angular deviation adjustment values $\Delta\alpha$ and $\Delta\beta$ are written in the EEPROM 10.

With the processing in steps S608 to S624, the gain adjustment and the detection angular deviation adjustment of the yaw and pitch angular velocity detecting circuits 8 and 9 can be performed.

In processing in step S625 and subsequent steps, anti-vibration controllability is systematically checked. The gain adjustment values A1 and A2 in the CPU 1 at the timing of step S625 have the initial value A0 set in step S700 in FIG. 8A, and the angular deviation adjustment values $\Delta\alpha$ and $\Delta\beta$ have the initial value 0 written in step S702 in FIG. 8A. In step S625, a data writing command is transmitted, and 1/m values of A1 and A2 calculated in step S622 are written in the gain adjustment values A1 and A2 in the CPU 1. Furthermore, the calculated values $\Delta\alpha$ and $\Delta\beta$ are written in the angular deviation adjustment values $\Delta\alpha$ and $\Delta\beta$ in the CPU 1 in step S623. Thereafter, the flow advances to step S626.

In step S626, the vibrator 18 is vibrated. In this case, the vibration is a sinusoidal vibration having a predetermined angular amplitude in the X-axis direction. In step S627, an anti-vibration control starting command is transmitted to the CPU 1. In response to the command in step S627, the CPU 1 executes the anti-vibration control starting processing in step S709 in FIG. 8A. Furthermore, in the anti-vibration control timer interruption processing shown in FIG. 14, the maximum and minimum values LRmax(X), LRmax(Y), LRmin(X), and LRmin(Y) of the anti-vibration lens positions, and the maximum and minimum values ΔLmax(X), ΔLmax(Y), ΔLmin(X), and ΔLmin(Y) of the anti-vibration lens control errors are kept detected. It is determined in step S1314 in FIG. 14 that the anti-vibration adjustment is not performed, and the motors are driven to control the anti-vibration lens 13 unlike in the above-mentioned gain adjustment and angular deviation adjustment.

In step S628, the control waits for a predetermined time. In step S629, an anti-vibration control ending command is transmitted. In response to this command, the CPU 1 inhibits the anti-vibration control timer interruption processing in step S712 in FIG. 8B, and ends the anti-vibration control. In step S630, the vibration application operation of the vibrator 18 ends. Note that the wait time in step S628 is a time in which at least one vibration application period of the vibrator 18 is formed during the time interval from step S627 to step S629. This is to check whether or not controllability is good at all the timings of one period during sinusoidal control of the anti-vibration lens 13. The flow advances from step S630 to step S631 in FIG. 7C. In step S631, using a data reading command, the maximum and minimum values LRmax(X) and LRmin(X) of the X-axis anti-vibration lens position and the maximum and minimum values ΔLmax(X) and ΔLmin(X) of the X-axis anti-vibration lens position error, which are detected by the CPU 1, are read from the CPU 1. In step S632, an amplitude g, in the X-axis direction, of the actually controlled anti-vibration lens 13 is calculated using the following equation (49):

$$g = LRmax(X) - LRmin(X) \qquad (49)$$

It is then checked in step S633 if the absolute value of a value obtained by subtracting the actual total amplitude g, in the X-axis direction, of the anti-vibration lens 13 obtained in step S632 from a 1/m value of the total amplitude L01 to be obtained after gain adjustment, in the X-axis direction, of the anti-vibration lens 13 is equal to or smaller than a predetermined value. If YES in step S633, the flow advances to step S634; otherwise, the flow advances to step S646 to determine a defect in the anti-vibration lens shift mechanism system or adjustment. Thereafter, the flow advances to step S647.

In step S625, since the anti-vibration gain adjustment value A1 in the yaw direction is obtained by multiplying the adjustment value calculated in step S622 with 1/m, if the actually obtained amplitude g of the anti-vibration lens 13 becomes 1/m of L01, it can be confirmed that the gain adjustment has been attained with high precision, and the anti-vibration controllability is good. However, when the gain adjustment is not performed precisely due to some causes, or when the total amplitude of the actually controlled anti-vibration lens 13 does not coincide with a theoretical value due to non-smooth movement of the anti-vibration lens shift mechanism system, a defect can be checked in this decision step S633.

It is then checked in step S634 if the absolute value of the maximum value ΔLmax(X) of the anti-vibration lens position error in the X-axis direction is equal to or smaller than a predetermined value. If YES in step S634, the flow advances to step S635; otherwise, the flow advances to step S646 to determine a defect in the anti-vibration lens shift mechanism system or adjustment. Thereafter, the flow advances to step S647. Furthermore, it is checked in step S635 if the absolute value of the minimum value ΔLmin(X) of the anti-vibration lens position error in the X-axis direction is equal to or smaller than a predetermined value. If YES in step S635, the flow advances to step S636; otherwise, the flow advances to step S646 to determine a defect in the anti-vibration lens shift mechanism system or adjustment. Thereafter, the flow advances to step S647.

In the processing in step S634 and S635, the controllability, in the X-axis direction, of the anti-vibration lens 13 is checked. In the above-mentioned anti-vibration control timer interruption processing, the anti-vibration lens position error ΔL(X) as the difference between the anti-vibration lens target position LC(X) and the actually controlled anti-vibration lens position LR(X) is calculated, and the maximum and minimum values ΔLmax(X) and ΔLmin(X) are detected. If it is determined in steps S634 and S635 that the absolute values of ΔLmax(X) and ΔLmin(X) are small, it can be determined that the controllability is good; otherwise, it can be determined that the controllability is bad.

In processing in step S636 and subsequent steps, the anti-vibration controllability in the Y-axis direction is checked. In step S636, the vibrator 18 is vibrated. In this case, the vibration is a sinusoidal vibration having a predetermined angular amplitude in the Y-axis direction. In step S637, an anti-vibration control starting command is transmitted to the CPU 1. In response to the command in step S637, the CPU 1 executes the anti-vibration control starting processing in step S709 in FIG. 8A. Furthermore, in the anti-vibration control timer interruption processing shown in FIG. 14, the maximum and minimum values LRmax(X), LRmax(Y), LRmin(X), and LRmin(Y) of the anti-vibration lens positions, and the maximum and minimum values ΔLmax(X), ΔLmax(Y), ΔLmin(X), and ΔLmin(Y) of the anti-vibration lens control errors are kept detected. It is determined in step S1314 in FIG. 14 that the anti-vibration adjustment is not performed, and the motors are driven to control the anti-vibration lens 13.

In step S638, the control waits for a predetermined time. In step S639, an anti-vibration control ending command is transmitted. In response to this command, the CPU 1 inhibits the anti-vibration control timer interruption processing in step S712 in FIG. 8B, and ends the anti-vibration control. In step S640, the vibration application operation of the vibrator 18 ends. Note that the wait time in step S638 is a time in which at least one vibration application period of the vibrator 18 is formed during the time interval from step S637 to step S639. This is for the same reason as in the wait time in step S628 above. In step S641, using a data reading command, the maximum and minimum values LRmax(Y) and LRmin(Y) of the Y-axis anti-vibration lens position and the maximum and minimum values ΔLmax(Y) and ΔLmin(Y) of the Y-axis anti-vibration lens position error, which are detected by the CPU 1, are read from the CPU 1. In step S642, an amplitude h, in the X-axis direction, of the actually controlled anti-vibration lens 13 is calculated using the following equation (50):

$$h = LRmax(Y) - LRmin(Y) \qquad (50)$$

It is then checked in step S643 if the absolute value of a value obtained by subtracting the actual total amplitude h, in the Y-axis direction, of the anti-vibration lens 13 obtained in step S642 from a 1/m value of the total amplitude L02 to be obtained after gain adjustment, in the Y-axis direction, of the anti-vibration lens 13 is equal to or smaller than a predetermined value. If YES in step S643, the flow advances to step S644; otherwise, the flow advances to step S646 to determine a defect in the anti-vibration lens shift mechanism system or adjustment. Thereafter, the flow advances to step S647.

The above-mentioned discrimination in step S643 performed for the same reason as in step S633 above.

It is then checked in step S644 if the absolute value of the maximum value ΔLmax(Y) of the anti-vibration lens position error in the Y-axis direction is equal to or smaller than a predetermined value. If YES in step S644, the flow advances to step S645; otherwise, the flow advances to step S646 to determine a defect in the anti-vibration lens shift mechanism system or adjustment. Thereafter, the flow advances to step S647. Furthermore, it is checked in step S645 if the absolute value of the minimum value ΔLmin(Y) of the anti-vibration lens position error in the Y-axis direction is equal to or smaller than a predetermined value. If YES in step S645, the flow advances to step S647; otherwise, the flow advances to step S646 to determine a defect in the anti-vibration lens shift mechanism system or adjustment. Thereafter, the flow advances to step S647.

In the processing in step S644 and S645, the controllability, in the Y-axis direction, of the anti-vibration lens 13 is checked. In the above-mentioned anti-vibration control timer interruption processing, the anti-vibration lens position error ΔL(Y) as the difference between the anti-vibration lens target position LC(Y) and the actually controlled anti-vibration lens position LR(Y) is calculated, and the maximum and minimum values ΔLmax(Y) and ΔLmin(Y) are detected. If it is determined in steps S644 and S645 that the absolute values of ΔLmax(Y) and ΔLmin(Y) are small, it can be determined that the controllability is good; otherwise, it can be determined that the controllability is bad.

An anti-vibration lens resetting command is transmitted to the CPU 1 in step S647. The CPU 1 drives the anti-vibration lens 13 to a predetermined resetting position in step S704 in FIG. 8A. Then, a communication mode releasing command is transmitted to the CPU 1 in step S648, thus releasing the camera from the communication mode. Then, the communication tool adjusting processing ends in step S649.

The reason why the gain adjustment values A1 and A2 are set to be 1/m in step S625 is as follows. Normally, in the gain adjustment and angular deviation adjustment, the outputs from the yaw and pitch angular velocity detecting circuits 8 and 9 are increased to widen the dynamic range, thereby improving adjustment precision. Therefore, the vibration application angle of the vibrator 18 increases. In this case, when the above-mentioned checking operation of the anti-vibration controllability is performed with this vibration application angle, the anti-vibration lens 13 must be controlled beyond the driving performance of the anti-vibration lens shift mechanism system, or the shift range of the anti-vibration lens 13 may be exceeded.

On the other hand, the angle range or angular velocity of a camera shake caused by a user who uses the camera is smaller than an angle to be subjected to the gain adjustment and the angular deviation adjustment. Therefore, only when the anti-vibration controllability is checked, the vibration application angle of the vibrator 18 may be decreased accordingly. However, it is not easy to mechanically set the vibration application angle of the vibrator 18 in two steps. For this reason, the value m is selected to fall with the angle range or angular velocity range of a camera shake caused by a user when he or she uses the camera, and practical anti-vibration controllability is checked. When such an anti-vibration controllability checking operation is performed by varying the value m, checking precision can be improved. On the other hand, it is not easy to mechanically set the vibration application angle of the vibrator 18 in a plurality of steps.

The processing executed when the camera is used by a user will be explained below. FIG. 18 is a flow chart showing an embodiment of half-depression processing of the camera according to the present invention. The processing shown in FIG. 18 is executed when the half-depression SW 16 of the camera is turned on. When the processing is started in step S1700, the gain adjustment values A1 and A2 are read from the EEPROM 10 in step S1701. Furthermore, the angular deviation adjustment values Δα and Δβ are read from the EEPROM 10 in step S1702.

It is then checked in step S1703 if the full-depression SW 17 is ON. If YES in step S1703, the flow advances to step S1706. On the other hand, if NO in step S1703, the flow advances to step S1704 to check if the half-depression SW 16 is ON. If YES in step S1704, the flow returns to step S1703; otherwise, the flow advances to step S1705 to end this processing.

In step S1706, the above-mentioned anti-vibration lens centering processing (FIG. 10) is performed to drive the anti-vibration lens 13 to the central positions in the X- and Y-axis directions. In step S1707, the anti-vibration control starting processing (FIG. 11) is executed. Therefore, in this case, since the anti-vibration control timer interruption processing (FIG. 14) is permitted, the anti-vibration control is started.

In step S1708, the shutter is opened/closed to perform exposure processing. Upon completion of the exposure processing, the anti-vibration control timer interruption processing is inhibited in step S1709 to end the anti-vibration control. The motors 4 and 5 are set in a short-brake state for a predetermined period of time to stop the anti-vibration lens 13. In step S1710, the anti-vibration lens 13 is driven to the resetting position by the anti-vibration lens resetting processing (FIG. 9). The flow then advances to step S1711 to end the half-depression processing.

In each anti-vibration control timer interruption generated from when the anti-vibration control is started in step S1707 until the anti-vibration control including the exposure processing ends in step S1709, the gain adjustment values A1 and A2 and the angular deviation adjustment values Δα and Δβ are read from the EEPROM 10 in steps S1701 and S1702, gain variations are corrected in step S1306, and the anti-vibration control is executed in step S1307 based on the outputs, angular deviations of which are corrected. With this processing, the anti-vibration control can be realized with high precision.

The embodiment of the present invention has been exemplified. However, the present invention is not limited to the above-mentioned embodiment, and various modifications may be made without departing from the scope of the invention.

For example, in the above embodiment, angular deviation amounts are electrically detected, and the adjustment values therefor are written in the EEPROM 10 of the camera, thereby electrically correcting the angular deviations. Alternatively, after the angular deviation amounts are detected by the above-mentioned method, adjustment of the detected angular deviations may be attained by mechanically adjusting the angles of the angular velocity sensors or the angular velocity detecting circuits.

In the above description, the PWM control is adopted as the velocity control method of the motors 4 and 5. However, the control method of the motors 4 and 5 is not limited to this method.

Furthermore, in the above embodiment, as a method of changing the optical axis of the photographing optical system, the method of shifting a portion (anti-vibration lens 13) of the photographing optical system has been exemplified. In place of this method, a variangle prism or the like may be used, or other actuators such as voice coils and the like may be used in place of the motors.

In the embodiment of the present invention, the communication tool side performs inspection and adjustment of the blur correction function of the camera. However, the present invention is not limited to this arrangement. For example, if the CPU 1 of the camera has these inspection and adjustment functions, self-diagnosis can be performed by the camera itself.

Therefore, it is intended that the invention not be limited to the preferred embodiments described herein, but that the invention will include all embodiments falling within the scope of the appended claims.

What is claimed is:

1. A method of inspecting a blur correction function of a blur correction camera, comprising the steps of:
   applying a sinusoidal vibration having a predetermined angular amplitude in a detection direction of an angular velocity of an angular velocity detecting unit;
   detecting maximum and minimum values of a displacement of a photographing optical system upon application of the sinusoidal vibration; and
   discriminating, based on the maximum and minimum values, whether the blur correction function is normal for changing an optical axis of the photographing optical system of the blur correction camera.

2. A method of inspecting a blur correction function of a blur correction camera, comprising the steps of:
   applying a predetermined vibration to the blur correction camera;
   calculating a target displacement position of an optical axis changing unit by integrating or accumulating an output value from an angular velocity detecting unit upon application of the predetermined vibration;
   calculating a control error of the optical axis changing unit based on a displacement of a photographing optical system by the optical axis changing unit and the target displacement position; and
   discriminating, based on the control error, whether the blur correction function is normal for changing an optical axis of the photographing optical system of the blur correction camera.

3. A method according to claim 2, wherein whether the blur correction function is normal is discriminated based on a maximum value and/or a minimum value of the control error.

4. A method of inspecting a blur correction function of a blur correction camera, comprising the steps of:
   applying a predetermined vibration to the blur correction camera;
   changing the gain adjustment value of the blur correction camera to a value corresponding to an angle or angular velocity range of the predetermined vibration applied in said applying; and
   discriminating whether the blur correction function is normal for changing an optical axis of the photographing optical system of the blur correction camera, based on an output value obtained from a maximum/minimum displacement detecting unit using the gain adjustment value changed by said changing step.

5. A method of inspecting a blur correction function of a blur correction camera, comprising the steps of:
   applying a predetermined vibration to the blur correction camera;
   changing a gain adjustment value of the blur correction camera to a value corresponding to an angle or angular velocity range of the predetermined vibration applied in said applying step; and
   discriminating whether the blur correction function is normal for changing an optical axis of the photographing optical system of the blur correction camera, based on a control error calculated by a calculation unit using the gain adjustment value changed by said changing step.

6. A method according to claim 5, wherein whether the blur correction function of the blur correction camera is normal is discriminated based on a maximum value and/or a minimum value of the control error.

7. An apparatus to adjust a blur correction function of a blur correction camera, which can correct an image blur on an image plane of said blur correction camera caused by a vibration of said blur correction camera, and comprises an angular velocity detecting unit to detect an angular velocity caused by the vibration, a storage unit to store a gain adjustment value to adjust a gain variation of output values among devices in said angular velocity detecting unit, and a gain correction unit to adjust the gain variation of the output values from said angular velocity detecting unit based upon the gain adjustment value stored in said storage unit, the apparatus comprising:
   a vibration applying unit to apply a sinusoidal vibration having one of a predetermined angular velocity amplitude and an angular amplitude to said blur correction camera;
   a calculation unit to calculate the gain adjustment value to adjust the gain variation of the output values among the devices in said angular velocity detecting unit based upon the output values from said angular velocity detecting unit obtained in response to the sinusoidal vibration being applied to said blur correction camera, or an integrated or an accumulated value of the output values; and
   a writing unit to write the gain adjustment value calculated by said calculation unit in said storage unit of said blur correction camera.

8. An apparatus to adjust a blur correction function of a blur correction camera, which can correct an image blur on an image plane of said blur correction camera caused by a vibration of said blur correction camera, and comprises an angular velocity detecting unit to detect an angular velocity caused by the vibration, an A/D conversion unit to A/D-convert output values from said angular velocity detecting unit, a storage unit to store a gain adjustment value to adjust a gain variation of output values among devices in said angular velocity detecting unit and said A/D conversion unit, and a gain correction unit to adjust the gain variation of the output values among the devices in said angular velocity detecting unit and said A/D conversion unit based upon the gain adjustment value stored in said storage unit, the apparatus comprising:
   a vibration applying unit to apply a sinusoidal vibration having one of a predetermined angular velocity amplitude and an angular amplitude to said blur correction camera;
   a calculation unit to calculate the gain adjustment value to adjust the gain variation of the output values among the devices in said angular velocity detecting unit based upon the output values from said angular velocity detecting unit obtained in response to the sinusoidal vibration being applied to said blur correction camera, or an integrated or an accumulated value of the output values; and
   a writing unit to write the gain adjustment value calculated by said calculation unit in said storage unit of said blur correction camera.

9. A blur correction camera which can correct an image blur on an image plane of said blur correction camera caused by a vibration of said blur correction camera, said blur correction camera comprising:

an angular velocity detecting unit to detect an angular velocity caused by the vibration;

a storage unit to store a gain adjustment value to adjust a gain variation of output values among devices in said angular velocity detecting unit; and a gain correction unit to adjust the gain variation of the output values from said angular velocity detecting unit based upon the gain adjustment value stored in said storage unit, wherein the gain adjustment value is calculated based upon the output values from said angular velocity detecting unit obtained in response to a sinusoidal vibration having a predetermined angular velocity amplitude being applied in a detection direction of the angular velocity of said angular velocity detecting unit of said blur correction camera.

10. The camera according to claim 9, wherein the gain adjustment value is calculated based upon maximum and minimum values of the output values from said angular velocity detecting unit.

11. A blur correction camera which can correct an image blur on an image plane of said blur correction camera caused by a vibration of said blur correction camera, said blur correction camera comprising:

an angular velocity detecting unit to detect an angular velocity caused by the vibration;

a storage unit to store a gain adjustment value to adjust a gain variation of output values among devices in said angular velocity detecting unit; and a gain correction unit to adjust the gain variation of the output values from said angular velocity detecting unit based upon the gain adjustment value stored in said storage unit, wherein the gain adjustment value is calculated based upon an integrated or accumulated value of the output values from said angular velocity detecting unit obtained in response to a sinusoidal vibration having a predetermined angular amplitude being applied in a detection direction of the angular velocity of said angular velocity detecting unit of said blur correction camera.

12. A camera according to claim 11, wherein the gain adjustment value is calculated based upon maximum and minimum values of the integrated or accumulated value.

13. A blur correction camera which can correct an image blur on an image plane of said blur correction camera caused by a vibration of said blur correction camera, said blur correction camera comprising:

an angular velocity detecting unit to detect an angular velocity caused by the vibration;

an A/D conversion unit to A/D-convert output values from said angular velocity detecting unit;

a storage unit to store a gain adjustment value to adjust a gain variation of output values among devices in said angular velocity detecting unit and said A/D conversion unit; and a gain correction unit to adjust the gain variation of the output values from said angular velocity detecting unit and said A/D conversion unit based upon the gain adjustment value stored in said storage unit, wherein the gain adjustment value is calculated based upon the output values from said A/D conversion unit obtained in response to a sinusoidal vibration having a predetermined angular velocity amplitude being applied in a detection direction of the angular velocity of said angular velocity detecting unit of said blur correction camera.

14. A blur correction camera which can correct an image blur on an image plane of said blur correction camera caused by a vibration of said blur correction camera, said blur correction camera comprising:

an angular velocity detecting unit to detect an angular velocity caused by the vibration;

an A/D conversion unit to A/D-convert output values from said angular velocity detecting unit;

a storage unit to store a gain adjustment value to adjust a gain variation of output values among devices in said angular velocity detecting unit and said A/D conversion unit; and a gain correction unit to adjust the gain variation of the output values from said angular velocity detecting unit and said A/D conversion unit based upon the gain adjustment value stored in said storage unit, wherein the gain adjustment value is calculated based upon an accumulated value obtained by accumulating the output values from said A/D conversion unit at a predetermined time interval, the output values being obtained in response to a sinusoidal vibration having a predetermined angular velocity amplitude being applied in a detection direction of the angular velocity of said angular velocity detecting unit of said blur correction camera.

15. A camera according to claim 14, wherein the gain adjustment value is calculated based upon maximum and minimum values of the accumulated value obtained by accumulating the output values from said A/D conversion unit at the predetermined time interval.

16. A method of adjusting a blur correction function of a blur correction camera, which can correct an image blur on an image plane of said blur correction camera caused by a vibration of said image blur correction camera, and comprises an angular velocity detecting unit to detect an angular velocity caused by the vibration, and/or an A/D conversion unit to A/D-convert output values from said angular velocity detecting unit, said method comprising the steps of:

applying a sinusoidal vibration having one of a predetermined angular velocity amplitude and an angular amplitude to said blur correction camera;

calculating a gain adjustment value to adjust a gain variation of output values among devices in said angular velocity detecting unit and/or said A/D conversion unit based upon any one of the output values from said angular velocity detecting unit, an integrated or accumulated value of the output values from said angular velocity detecting unit, the output values from said A/D conversion unit, and an accumulated value obtained by accumulating the output values from said A/D conversion unit at a predetermined time interval, which are obtained in response to application of the sinusoidal vibration; and adjusting the gain variation of the output values among devices in said angular velocity detecting unit and/or said A/D conversion unit based upon the gain adjustment value.

* * * * *

UNITED STATES PATENT AND TRADEMARK OFFICE
CERTIFICATE OF CORRECTION

PATENT NO. : 5,623,705
DATED : April 22, 1997
INVENTOR(S) : Sueyuki OHISHI, et al.

It is certified that error appears in the above-indentified patent and that said Letters Patent is hereby corrected as shown below:

Column 33, line 50, (claim 4) after "applying" insert --step--.

Signed and Sealed this

Twenty-ninth Day of July, 1997

Attest:

BRUCE LEHMAN

Attesting Officer

Commissioner of Patents and Trademarks